US010445350B2

(12) United States Patent
Bendig et al.

(10) Patent No.: US 10,445,350 B2
(45) Date of Patent: Oct. 15, 2019

(54) OPTIMIZING CONTENT FOR CONSISTENT PRESENTATION THROUGH COLLABORATION DATABASE SERVICE

(71) Applicant: MICROSOFT TECHNOLOGY LICENSING, LLC, Redmond, WA (US)

(72) Inventors: Krista Bendig, Redmond, WA (US); Michael R. Sullivan, Redmond, WA (US); Caoimhe Grace Dowling, Redmond, WA (US); Gergely Kota, Redmond, WA (US); Mark Peterson, Redmond, WA (US); Raul Clouse, Redmond, WA (US); Michael Cheng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 419 days.

(21) Appl. No.: 15/196,087

(22) Filed: Jun. 29, 2016

(65) Prior Publication Data

US 2017/0139958 A1 May 18, 2017

Related U.S. Application Data

(60) Provisional application No. 62/255,515, filed on Nov. 15, 2015.

(51) Int. Cl.
*G06F 16/332* (2019.01)
*G06F 16/951* (2019.01)
(Continued)

(52) U.S. Cl.
CPC ........ *G06F 16/3322* (2019.01); *G06F 3/0482* (2013.01); *G06F 16/176* (2019.01);
(Continued)

(58) Field of Classification Search
CPC .......... G06F 17/3064; G06F 17/30864; G06F 17/30011; G06F 17/30545;
(Continued)

(56) References Cited

U.S. PATENT DOCUMENTS 4,484,826 A 11/1984 Horn et al.
5,588,099 A * 12/1996 Mogilevsky .............. G06T 3/40
715/273

(Continued)

FOREIGN PATENT DOCUMENTS

EP 2891970 A1 7/2015
WO 9933007 A1 7/1999

OTHER PUBLICATIONS

Lin, Xiaofan, "Active document layout synthesis", In Proceedings of Eighth International Conference on Document Analysis and Recognition, Aug. 29, 2005, 5 pages.

(Continued)

*Primary Examiner* — James Trujillo
*Assistant Examiner* — Hubert Cheung
(74) *Attorney, Agent, or Firm* — Newport IP, LLC; Mike R. Cicero

(57) ABSTRACT

A collaboration database service may allow users to create, edit, and share collaborative content on custom databases consistently across a variety of platforms and devices. For example, a collaboration database engine of the service may be configured to detect creation of a table through an application associated with the service, the table including one or more columns and rows that form a plurality of cells. The engine may also be configured to determine and optionally reduce a character count of data within each cell, map each cell to a bucket based on the character count of the data, and automatically select an optimal configuration of the table to be provided for display through the application (Continued)

based on the mapping. The optimal configuration may maximize an amount of the data presented within each cell of the table and enable consistent presentation of the table across a variety of platforms and devices.

20 Claims, 13 Drawing Sheets

(51) Int. Cl.
| | |
|---|---|
| *G06F 16/93* | (2019.01) |
| *G06F 16/22* | (2019.01) |
| *G06F 16/25* | (2019.01) |
| *G06F 16/176* | (2019.01) |
| *G06F 17/24* | (2006.01) |
| *G06F 3/0482* | (2013.01) |
| *G06Q 10/10* | (2012.01) |

(52) U.S. Cl.
CPC ........ *G06F 16/221* (2019.01); *G06F 16/2282* (2019.01); *G06F 16/252* (2019.01); *G06F 16/93* (2019.01); *G06F 16/951* (2019.01); *G06F 17/245* (2013.01); *G06F 17/246* (2013.01); *G06Q 10/101* (2013.01)

(58) Field of Classification Search
CPC ......... G06F 17/30315; G06F 17/30572; G06F 17/30165; G06F 17/3056; G06F 17/30424; G06F 17/30339; G06F 17/30303; G06F 3/0482; G06F 3/04812; G06F 3/04847; G06F 3/04817; G06F 8/35; G06F 17/246; G06F 17/245; G06F 17/2288; G06F 16/3322; G06F 16/176; G06F 16/951; G06F 16/2471; G06F 16/2282; G06F 16/252; G06F 16/93; G06F 16/221; G06Q 10/101; H04L 67/20; H04L 67/306; H04L 37/02; H04L 65/403; H04L 51/046
See application file for complete search history.

(56) References Cited

U.S. PATENT DOCUMENTS

| | | | |
|---|---|---|---|
| 5,721,912 A | 2/1998 | Stepczyk et al. | |
| 5,808,914 A * | 9/1998 | Shin ................... | G06F 17/245 703/2 |
| 5,950,190 A | 9/1999 | Yeager et al. | |
| 6,014,138 A | 1/2000 | Cain et al. | |
| 6,044,383 A * | 3/2000 | Suzuki ................. | G06F 17/245 715/236 |
| 6,055,550 A * | 4/2000 | Wallack ............... | G06F 17/211 715/229 |
| 6,208,340 B1 | 3/2001 | Amin et al. | |
| 6,232,984 B1 | 5/2001 | Chuah et al. | |
| 6,279,008 B1 | 8/2001 | Tung Ng et al. | |
| 6,295,550 B1 | 9/2001 | Choung et al. | |
| 6,639,611 B1 | 10/2003 | Leduc | |
| 6,661,417 B1 | 12/2003 | Cheng | |
| 7,089,504 B1 | 8/2006 | Froloff | |
| 7,143,339 B2 * | 11/2006 | Weinberg ............. | G06F 17/243 715/212 |
| 7,167,731 B2 | 1/2007 | Nelson | |
| 7,370,290 B2 | 5/2008 | Grossman et al. | |
| 7,379,075 B2 | 5/2008 | Opstad et al. | |
| 7,523,395 B1 | 4/2009 | Namait et al. | |
| 7,543,237 B2 | 6/2009 | Kontny et al. | |
| 7,810,033 B2 | 10/2010 | Cordes et al. | |
| 7,853,961 B2 | 12/2010 | Nori et al. | |
| 8,046,677 B2 | 10/2011 | Eischeid | |
| 8,065,658 B1 | 11/2011 | Bali et al. | |
| 8,312,367 B2 | 11/2012 | Foster | |
| 8,386,609 B2 | 2/2013 | Anand et al. | |
| 8,484,560 B2 | 7/2013 | Vuong et al. | |
| 8,484,562 B2 | 7/2013 | Schorsch | |
| 8,610,718 B2 | 12/2013 | Suntinger et al. | |
| 8,615,707 B2 | 12/2013 | Fortuna et al. | |
| 8,626,795 B2 | 1/2014 | Jacobson et al. | |
| 8,938,690 B1 | 1/2015 | Khouri et al. | |
| 9,087,320 B2 | 7/2015 | Goldman et al. | |
| 9,202,249 B1 | 12/2015 | Cohen et al. | |
| 9,244,802 B2 | 1/2016 | Yalovsky et al. | |
| 2002/0047858 A1 | 4/2002 | Bayliss et al. | |
| 2002/0116417 A1 | 8/2002 | Weinberg et al. | |
| 2003/0028560 A1 | 2/2003 | Kudrolli et al. | |
| 2003/0142147 A1 | 7/2003 | Chen et al. | |
| 2003/0187716 A1 | 10/2003 | Lee | |
| 2004/0117358 A1 | 6/2004 | Von kaenel et al. | |
| 2004/0122683 A1 | 6/2004 | Grossman et al. | |
| 2005/0187956 A1 | 8/2005 | Sylvester et al. | |
| 2005/0208971 A1 | 9/2005 | Pappalardo et al. | |
| 2005/0275655 A1 | 12/2005 | Stolze et al. | |
| 2005/0278282 A1 | 12/2005 | Sheridan | |
| 2006/0053386 A1 | 3/2006 | Kuhl et al. | |
| 2006/0101351 A1 | 5/2006 | Cowham | |
| 2006/0195476 A1 | 8/2006 | Nori et al. | |
| 2006/0230032 A1 | 10/2006 | Brankov et al. | |
| 2007/0016575 A1 | 1/2007 | Hurst-hiller et al. | |
| 2007/0136654 A1 * | 6/2007 | Peters .................. | G06F 17/211 715/217 |
| 2007/0208992 A1 | 9/2007 | Koren | |
| 2007/0211062 A1 | 9/2007 | Engelman et al. | |
| 2007/0288318 A1 | 12/2007 | Gupta et al. | |
| 2008/0028290 A1 | 1/2008 | Suwiryo | |
| 2008/0208624 A1 | 8/2008 | Morita et al. | |
| 2009/0083614 A1 * | 3/2009 | Wedekind ............. | G06F 17/246 715/217 |
| 2009/0158189 A1 | 6/2009 | Itani | |
| 2010/0049683 A1 | 2/2010 | Carter | |
| 2010/0082536 A1 | 4/2010 | Cosic | |
| 2010/0174734 A1 | 7/2010 | Norbauer et al. | |
| 2010/0325173 A1 | 12/2010 | Haley et al. | |
| 2011/0093471 A1 | 4/2011 | Brockway et al. | |
| 2011/0175820 A1 | 7/2011 | Toba | |
| 2011/0191303 A1 | 8/2011 | Kaufman et al. | |
| 2011/0276868 A1 | 11/2011 | Hoke et al. | |
| 2012/0117105 A1 | 5/2012 | Thomas et al. | |
| 2013/0046544 A1 | 2/2013 | Kay et al. | |
| 2013/0047093 A1 | 2/2013 | Reuschel et al. | |
| 2013/0061121 A1 | 3/2013 | Thomsen | |
| 2013/0066922 A1 | 3/2013 | Jang et al. | |
| 2013/0144855 A1 | 6/2013 | Kaul et al. | |
| 2013/0218923 A1 | 8/2013 | Kaul et al. | |
| 2014/0012922 A1 | 1/2014 | Wu | |
| 2014/0032486 A1 | 1/2014 | Sharma et al. | |
| 2014/0059496 A1 | 2/2014 | White et al. | |
| 2014/0164944 A1 | 6/2014 | Sivakumar et al. | |
| 2014/0181703 A1 | 6/2014 | Sullivan et al. | |
| 2014/0208212 A1 | 7/2014 | Affronti et al. | |
| 2014/0237356 A1 | 8/2014 | Durga et al. | |
| 2014/0245119 A1 | 8/2014 | Barrus et al. | |
| 2014/0245120 A1 | 8/2014 | Schwartz et al. | |
| 2014/0310649 A1 | 10/2014 | Bernstein et al. | |
| 2014/0317116 A1 | 10/2014 | Shah et al. | |
| 2014/0344304 A1 | 11/2014 | Topatan et al. | |
| 2014/0379699 A1 | 12/2014 | Blyumen | |
| 2015/0046530 A1 | 2/2015 | Mieritz et al. | |
| 2015/0169733 A1 | 6/2015 | Motamedi et al. | |
| 2015/0331578 A1 | 11/2015 | Keslin et al. | |
| 2016/0248837 A1 * | 8/2016 | Cai ....................... | H04L 67/26 |
| 2017/0010771 A1 | 1/2017 | Bernstein et al. | |
| 2017/0118267 A1 * | 4/2017 | Philippov ............. | H04L 67/02 |
| 2017/0139884 A1 | 5/2017 | Bendig et al. | |
| 2017/0139890 A1 | 5/2017 | Bendig et al. | |
| 2017/0139927 A1 | 5/2017 | Bendig et al. | |
| 2017/0140047 A1 | 5/2017 | Bendig et al. | |

OTHER PUBLICATIONS

"Second Written Opinion Issued in PCT Application No. PCT/US2016/060766", dated Sep. 13, 2017, 6 Pages.

(56) References Cited

OTHER PUBLICATIONS

"International Search Report & Written Opinion Issued in PCT Application No. PCT/US2016/060766", dated Dec. 19, 2016, 11 Pages.

"International Preliminary Report on Patentability Issued in PCT Application No. PCT/US2016/060766", dated Jan. 31, 2018, 7 Pages.

"About Fusion Tables", Retrieved From: https://support.google.com/fusiontables/answer/2571232, Oct. 29, 2012, 4 Pages.

"Adding People to a Board", Retrieved From: http://help.trello.com/article/717-adding-people-to-a-board, Sep. 3, 2015, 4 Pages.

"Collaborative Database", Retrieved From: https://www.eda.europa.eu/what-we-do/activities/activities-search/collaborative-database, Mar. 11, 2015, 3 Pages.

"Create with Fusion Tables", Retrieved From: https://support.google.com/fusiontables/answer/184641?hl=en, Feb. 21, 2013, 2 Pages.

"Design Your Database Online", Retrieved From: https://www.vertabelo.com/, Sep. 9, 2014, 5 Pages.

"Force.com: A Comprehensive Look at the World's Premier Cloud-Computing Platform", In White Paper of SalesForce.com, Aug. 6, 2009, 30 Pages.

"Make an Online Collaborative Database in a Few Minutes", Retrieved From: https://web.archive.org/web/20130101000000/http://acropora.bio.mq.edu.au/resources/make-an-online-collaborative-database-in-a-few-minutes/, Apr. 10, 2013, 5 Pages.

"Managing Users", Retrieved From: https://www.zoho.com/reports/help/managing-users.html, Retrieved Date: May 30, 2016, 4 Pages.

"ReportPlus v4.0 User Guide", Retrieved From: http://dl.infragistics.com/reportplus/help/ReportPlus-v4.0-UserGuide.html, Nov. 1, 2015, 106 Pages.

"Non Final Office Action Issued in U.S. Appl. No. 15/196,082", dated Sep. 27, 2018, 22 Pages.

"Non Final Office Action Issued in U.S. Appl. No. 15/198,236", dated Oct. 3, 2018, 16 Pages.

Anslow, Craig, "Multi-touch Table User Interfaces for Collaborative Visual Software Analytics", A Thesis Submitted in Partial Fulfillment of the Requirements of the Victoria University of Wellington for the Degree of Doctor of Philosophy, Sep. 2010, 149 Pages.

Bort, Julie, "Google Introduces Fusion Tables for Database Collaboration, Visualization", Retrieved From: http://www.networkworld.com/article/2236073/opensource-subnet/google-introduces-fusion-tables-for-database-collaboration--visualization.html, Jun. 11, 2009, 2 Pages.

Csinger, Andrew, "User Models for Intent-Based Authoring", A Thesis Submitted in Partial Fulfillment of the Requirements of the University of British Columbia for the Degree of Doctor of Philosophy, Nov. 1995, 202 Pages.

Fuchs, et al., "Collaborative Data Analysis with Smart Tangible Devices", In Proceedings of International Society for Optics and Photonics, Feb. 3, 2014, 15 Pages.

Joe, "CRM 2011 Actionable Goal Charts and Dashboards", Retrieved From: http://www.powerobjects.com/2011/04/25/crm-2011-actionable-goal-charts-and-dashboards/, Apr. 25, 2011, 8 Pages.

"International Search Report and Written Opinion Issued in PCT Application No. PCT/US2016/060761", dated Dec. 14, 2016, 8 Pages.

"International Search Report and Written Opinion Issued in PCT Application No. PCT/US2016/060762", dated Dec. 20, 2016, 11 Pages.

"International Search Report and Written Opinion Issued in PCT Application No. PCT/US2016/060764", dated Dec. 20, 2016, 7 Pages.

"International Search Report and Written Opinion Issued in PCT Application No. PCT/US2016/060767", dated Dec. 19, 2016, 6 Pages.

Red, Paul, "How to Create Customized Dashboards for your Users", Retrieved From: https://www.docebo.com/knowledge-base/customized-users-dashboards/, Retrieved Date: May 30, 2016, 26 Pages.

Strom, David, "Simple Online Database Collaboration", Retrieved From: http://www.itworld.com/article/2826377/enterprise-software/simple-online-database-collaboration.html, Mar. 18, 2010, 2 Pages.

"Non Final Office Action Issued in U.S. Appl. No. 15/197,788", dated Jan. 10, 2019, 10 Pages.

"Non Final Office Action Issued in U.S. Appl. No. 15/198,375", dated Jan. 11, 2019, 11 Pages.

"Notice of Allowance Issued in U.S. Appl. No. 15/196,082", dated Mar. 18, 2019, 12 Pages.

"Final Office Action Issued in U.S. Appl. No. 15/198,236", dated Apr. 29, 2019, 19 Pages.

"Final Office Action Issued in U.S. Appl. No. 15/198,375", dated Aug. 2, 2019, 13 Pages.

"Final Office Action Issued in U.S. Appl. No. 15/197,788", dated Jul. 26, 2019, 6 Pages.

\* cited by examiner

OPTIMIZING CONTENT FOR CONSISTENT PRESENTATION THROUGH COLLABORATION DATABASE SERVICE

CROSS-REFERENCE TO RELATED APPLICATION

This application is a non-provisional application under 35 U.S.C § 119(e) of U.S. Provisional Application No. 62/255,515 filed on Nov. 15, 2015. The U.S. Provisional Application is herein incorporated by reference in its entirety.

BACKGROUND

Productivity applications, such as word-processing, spreadsheet, presentation, and notebook applications, among other examples, enable users to create, edit, and share content, where formatting is used to convey meaning of the content. Increasingly, productivity applications are being executed in collaborative environments, such that multiple users co-authoring a document or file, for example, may more efficiently edit and the share the updated content among one another.

Databases, unlike productivity applications, comprise a collection of custom entities that enable a user to configure the actual semantics of content rather than using formatting to convey meaning. However, databases are typically not approachable to an average user and are not optimized for collaborative editing and data sharing at an end user level.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a collaboration database service that may allow end users to create, edit, and share collaborative content on custom databases (for example, tables, presentations, word processing documents, spreadsheets, etc.) across a variety of platforms and devices. For example, a collaboration database engine of the collaboration service may be configured to detect creation of a table through an application associated with the collaboration service. The table may include one or more columns and one or more rows that form a plurality of cells. The collaboration database engine may also be configured to determine a character count of data within each cell of the plurality of cells, map each cell to a bucket based on the character count of the data, and automatically select an optimal configuration of the table to be provided for display through the application based on the mapping. The optimal configuration may maximize an amount of the data presented within each cell of the table and enable consistent presentation of the table across a variety of platforms and devices. In response to a modification to the table, the collaboration database engine may further be configured to adjust the optimal configuration of the table.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
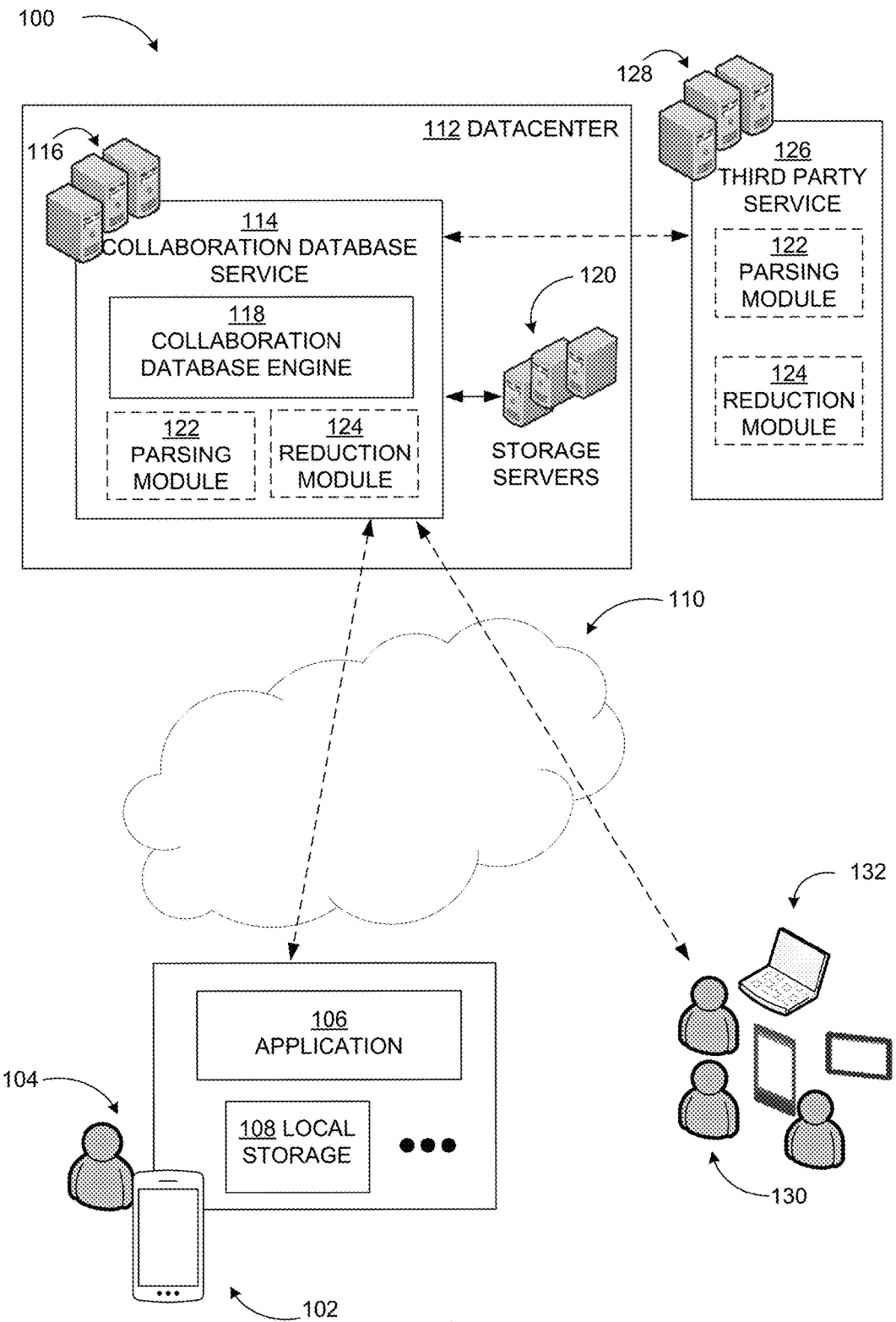
FIG. 1 includes an example network environment where a system to optimize content for consistent presentation across a variety of platforms and devices may be implemented.

As briefly described above, a collaboration database service comprising a collaboration database engine may be configured to optimize presentation of a table such that the table preserves its look and feel across multiple different platforms and devices while maintaining maximal presentation of data within the table. The collaboration database engine may be configured to detect creation of the table through an application associated with the collaboration service, where the table may include one or more columns and one or more rows that form a plurality of cells. The application may be a collaboration database application or the productivity application, for example. The collaboration database engine may be configured to determine a character count of data within each cell of the plurality of cells. In some examples, if the character count can be reduced while maintaining a same semantic meaning of the data, the collaboration database engine may also be configured to reduce the character count of the data by employing algorithms to execute one or more reduction processes.

The collaboration database engine may be configured to map each cell to a size-based bucket based on the character count of the data or the reduced character count of the data. The collaboration database engine may then be configured to automatically select an optimal configuration of the table to be provided for display through the application based on the mapping, as well as device and/or display capabilities and a type of data. The optimal configuration may maximize an amount of the data presented within each cell of the table and enable consistent presentation of the table across a variety of platforms and devices. In response to detecting additional data and/or an additional data type being inserted into the table, the collaboration database engine may be configured to adjust the optimal configuration of the table.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to optimize content for consistent presentation across a variety of platforms and devices through a collaboration database service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system to optimize content for consistent presentation across a variety of platforms and devices may be implemented.

As illustrated in diagram 100, an example system may include a datacenter 112 hosting a collaboration database service 114 configured to enable creation and collaboration of content on custom databases, where the content may include a table, for example. The datacenter 112 may include one or more processing servers 116, of which, at least one may be operable to execute a collaboration database engine 118 of the collaboration database service 114, among other components. The datacenter 112 may also include one or more storage servers 120 configured to manage one or more data stores comprising data associated with the collaboration database engine 118. As described herein, the collaboration database engine 118 may be implemented as software, hardware, or combinations thereof.

In some embodiments, the collaboration database service 114 may be configured to integrate and interoperate with various applications. For example, as illustrated in the diagram 100, a customer 104 may execute a thin (e.g., a web browser) or a thick (e.g., a locally installed client application) version of an application 106 through a device 102 with which the collaboration database service 114 may be configured to integrate and interoperate with over one or more networks, such as network 110. The application 106 may be a productivity application, such as a word-processing application, a spreadsheet application, a presentation application, or a notebook application, for example, such that collaborative content created through the productivity application may be shared, presented, and edited through the collaboration database service 114. Alternatively, the application 106 may be an application hosted by the collaboration database service (a collaboration database application, for example). The device 102 may include a desktop computer, a laptop computer, a tablet computer, a vehicle mount computer, a smart phone, or a wearable computing device, among other similar devices. A communication interface may facilitate communication between the collaboration database service 114 and the application 106 over the network 110.

In one embodiment, the collaboration database engine 118 may be configured to detect creation of a table through the application 106. The table may include one or more columns and one or more rows that form a plurality of cells. The collaboration database engine 118 may be configured to determine a character count of data within each cell of the plurality of cells. In some examples, carriage returns within each cell may also be determined. If the character count of the data can be reduced while maintaining a same semantic meaning of the data, the collaboration database engine 118 may also be configured to reduce the character count of the data by employing algorithms to execute one or more reduction processes.

For example, a parsing module 122 and a reduction module 124 may be employed by the collaboration database engine 118. The parsing module 122 and reduction module 124 may be integral modules of the collaboration database service 114 and/or modules of a third party service 126 hosted by one or more servers 128, as illustrated. The parsing module 122 may be configured to parse the data within each cell into one or more levels prior to execution of the reduction processes. The levels may include paragraphs, sentences, lists, fragment, and words, among others. The reduction module 124 may be configured to provide the parsed data to the algorithms for execution of the reduction processes, and monitor the reduction processes until a preferred character count is reached. Example reduction processes may include replacement of words formed by characters of the data with acronyms, contractions, and/or abbreviations, gerund reduction of words, elimination of low value words, replacement of words with symbols having a same semantic meaning, and truncation of characters of the data based on a preferred character count. The reduction processes may be executed individually, in any combination and/or order.

The collaboration database engine 118 may be configured to map each cell to a size-based bucket based on the character count of the data or the reduced character count of the data if the character count of the data. In some embodiments, each cell may be mapped to the bucket based on carriage returns in addition to the character count of the data within each cell. For example, each cell may be mapped to one of an extra small bucket, a small bucket, a medium bucket, a large bucket, and an extra-large bucket based on the carriage returns and/or character count of the data within each cell. Each bucket may be characterized by a predetermined number of pixels supported by the bucket, a number of data characters displayed per line by the bucket, and a general type of information displayed by the bucket, which is further described in FIG. 4 below.

The collaboration database engine 118 may then be configured to automatically select an optimal configuration of the table to be provided for display through the application 106. In some examples, the optimal configuration may be a pre-set design of the table. The optimal configuration may maximize an amount of the data presented within each cell of the table. Additionally, the optimal configuration may enable consistent presentation of the table across a variety of platforms and devices such that a look and feel of the table may be preserved no matter what platform or device the customer 104 is using to view and/or edit the table. In some embodiments, the customer 104 may view how the table will look on other platforms or devices through a preview feature provided by the collaboration database engine 118 through the application 106.

The optimal configuration may be automatically selected based on the mapping, as well as device capabilities and/or display capabilities of the device 102, and a type of the data (e.g., images, numeric data, textual data, graphic data). For example, the width of each column of the table may be selected based on the mapping. In one embodiment, the width of a column of the table may be selected based on a largest size bucket to which a cell of the column is mapped. For example, if the column has three cells, where two cells are mapped to a small bucket and the other cell is mapped to a large bucket, the width of the column may be selected based on the large bucket. In an alternative embodiment, the collaboration database engine may be configured to determine how many cells of a column are mapped to each size bucket, and the width of the column selected may be based on a size bucket corresponding to a weighted average of the cells of the column. The cells may be individually weighted, for example, based on an importance of the data contained within the cell. To provide an illustration, if the column has three cells, where two cells are mapped to a small bucket and the other cell is mapped to a large bucket and each cell is of equal importance (and thus weighted equally), than the weighted average of the cells of the column would correspond to the small bucket and the width of the column may be selected based on the small bucket. However, if the other cell mapped to the large bucket is of greater importance it may be more heavily weighted such that the weighted average of the cells of the column would correspond to the large bucket and the width of the column may be selected based on the large bucket. Either of these embodiments for selecting a width of the column may be repeated for each column of the table. Additionally, a label of the column, such as a title, may be wrapped to match the width selected for each column such that a longer title, for example, does not force the column to be wider than necessary to present data within the cells of the column. Furthermore, a height of the rows of the table may be adjusted based on device and/or display capabilities of the device 102 and/or type of data within the table to further optimize the table for presentation.

The collaboration database engine 118 may be further configured to adjust the optimal configuration of the table in response to detecting a modification to the table through the application 106. An example of a modification detected may include additional data being inserted into the table by the customer 104 and/or an additional data type being inserted into the table by the customer 104. Once the collaboration database engine 118 has provided the optimal configuration and/or adjusted optimal configuration of the table for display through the application 106, the table may be stored locally at local storage 108 of the device 102 and/or remotely at the data stores managed by the storage servers 120, or by third party storage services. The collaboration database engine 118 may also be configured to share a copy of the table with other customers 130 who may be collaborating on the table with the customer 104 through various devices 132 associated with the other customers 134. The shared copy will present the optimal configuration of the table to the customers 134 such that a maximal amount of the data is presented within each cell of the table and the look and feel of the table as created by the customer 104 is preserved no matter what platforms or devices 132 the other customers 130 are using to view and/or edit the table.

As described in FIG. 1, embodiments are directed to a collaboration database service that may allow end users to create, edit, and share collaborative content on custom databases such that a maximal amount of content is presented and the content is presented consistently across a variety of platforms and devices. For example, table optimization may be used to increase the readability and usability of a grid, such as a width of columns or a height of rows, and preset designs for the table configuration may enhance user experience. Optimization may also provide consistent experience across web and mobile platforms, among other platforms, allowing automatic setting of table configurations based on device and/or display capabilities, as well as data types. Table configurations may be adjusted upon addition of new data or new types of data by the user. For example, as a user enters content, the table may adapt and after some use, the user may expect particular changes and/or adjustments to the table. Therefore, implementation of the collaboration database service to optimize table presentation may increase efficiency in user interaction, data management, and data presentation in collaborative environments across multiple platforms and devices.

The collaboration database service according to embodiments may not only provide easy creation, optimization, and sharing of content for consistent presentation across devices, but may also integrate and interoperate with various productivity application workloads such that collaborative content created through the productivity application may be shared, presented, and edited through the collaboration database service. Each productivity application may play a unique role, and those individual strengths may be highlighted in an example service to bring the system together. For example, databases are typically not approachable to an average user, however the average user may already be familiar and comfortable interacting with a productivity application to create, edit, and share data. Therefore, the collaboration database service may improve user interactivity by allowing users to create, edit, and view richer, faster, and more secure data without having to learn or work with complex database systems.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of applications to enable creating, editing, and sharing of collaborative content among customers across multiple different platforms and devices.

Figure 2:
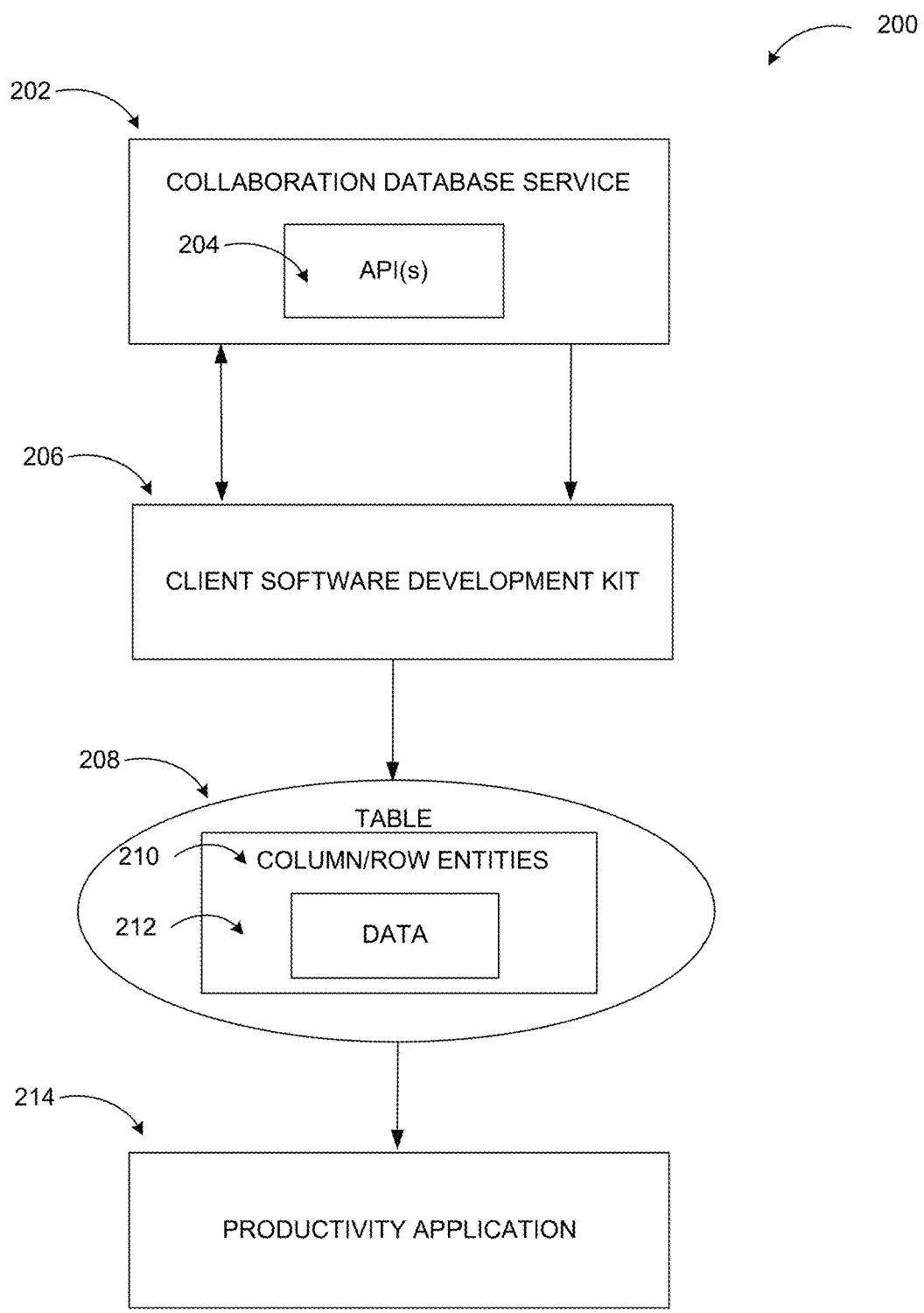
FIG. 2 includes an example infrastructure implemented for optimization of content through a content database service.

FIG. 2 includes an example infrastructure implemented for optimization of content through a content database service.

As shown in a diagram 200, a collaboration database service 202 may be provided to enable creation and collaboration of content on custom databases. The collaboration database service 202 may also integrate and/or interoperate with a productivity application 214 such that collaborative content created through the productivity application 214 may be shared, presented, and/or edited through the collaboration database service 202. By optimizing the content for presentation, the maximal content may be presented and the look and feel of the content may be preserved across a variety of platforms and devices. The integration and/or interoperation between the collaboration database service 202 and the productivity application 214 may be enabled through a client software development kit (SDK) 206. In one example, the client SDK 206 may implement one or more application programming interfaces (APIs) 204 of the collaboration database service 202 to communicate with the productivity application 214 to achieve integration and/or interoperation.

In an example scenario, the collaboration database engine of the collaboration database service 202 may detect creation of a table 208 through the productivity application 214. The table 208 may include one or more columns and rows that form a plurality of cells. The columns and rows may be configured as entities 210 of the table 208, and the entities 210 may contain data 212 that is inserted within each cell of the respective column and/or row. The collaboration database engine may be configured to determine a character count of the data within each cell, map each cell to a bucket based on the character count of the data, and automatically select an optimal configuration of the table 208 to be provided for display through the productivity application 214 based on the mapping. The optimal configuration may maximize an amount of the data presented within each cell of the table 208 and enable consistent presentation of the table 208 across a variety of platforms and devices. In response to detecting a modification to the table 208 through the productivity application 214, the collaboration database engine may further be configured to adjust the optimal configuration of the table 208.

Figure 3:
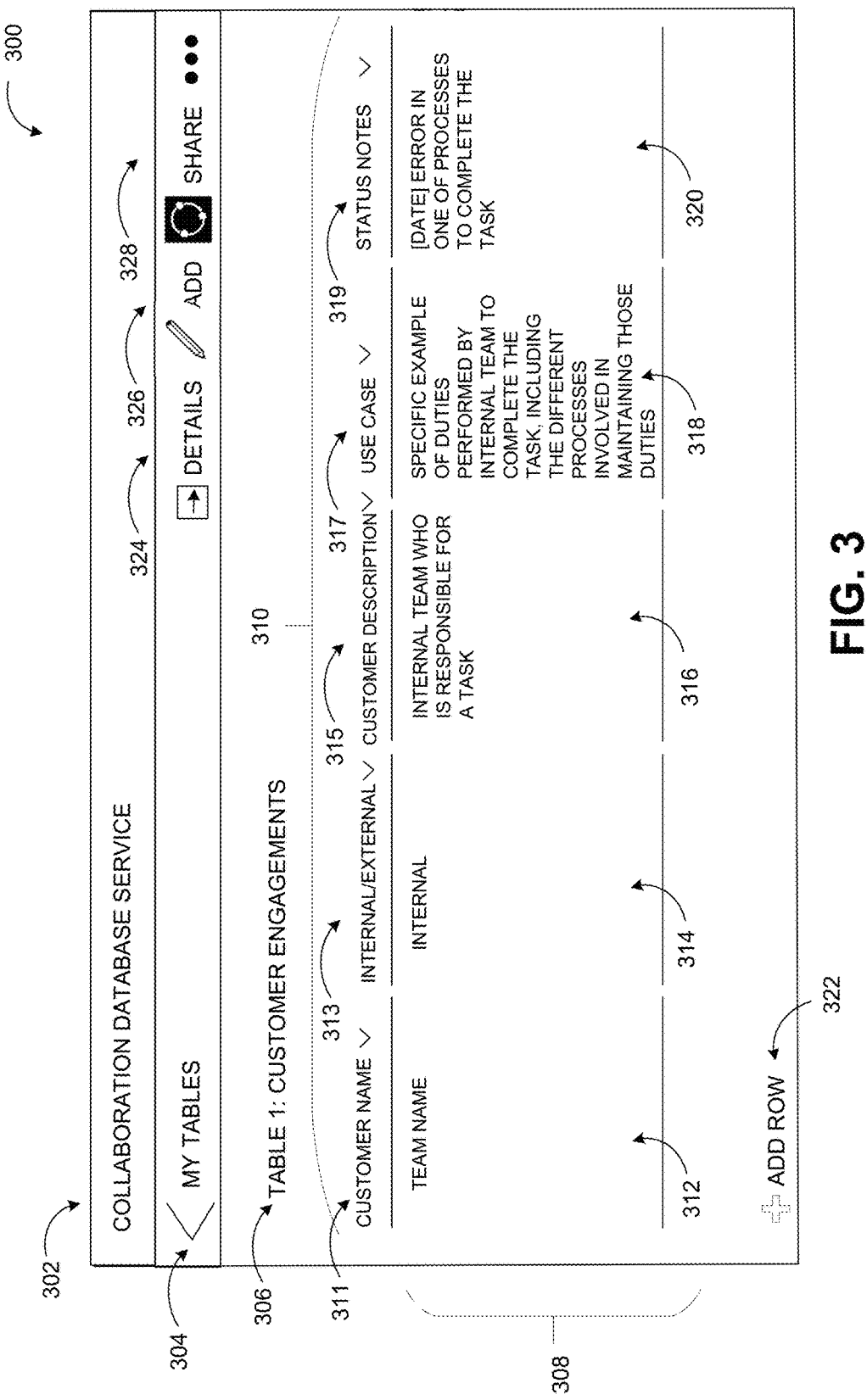
FIG. 3 illustrates a configuration of a table prior to optimization.

FIG. 3 illustrates a configuration of a table prior to optimization. As previously discussed, a collaboration database service may be provided to enable creation and collaboration of content, such as a table on custom databases, where the collaboration database service may include a collaboration database engine. The content may be displayed through an application associated with the collaboration database service that is executed on a user device to enable interactivity with the content. The user device may have one or more input device(s) such that a user may interact with the content through a keyboard input, a mouse input, a pen input, a touch, an optically captured gesture, a voice input, a gyroscopic input, and/or an eye-tracking input, for example.

As shown in a diagram 300, the collaboration database service may provide a user experience 302 through the application to enable a user to create and/or modify a table 306 through a "My Tables" view 304. The table may include a row 308 and one or more columns 310 that form a plurality of cells 312, 314, 316, 318, and 320, as illustrated. In an example scenario, the table 306 may list customers associated with a company. The row 308 may represent a customer and the columns 310 may include a customer name column 311, an internal/external column 313, a customer description column 315, a use case column 317, and a status notes column 319, for example. Each of the cells 312, 314, 316, 318, and 320 may contain data associated with the customer, where the data within each cell may be of a different type, size, and/or character count.

The user experience 302 may also provide one or more controls to enable the user to interact with the table 306. The control elements may be presented graphically through icons or symbols and/or textually, where the text may describe a function to be performed by the control elements. For example, an "add row" control element 322 may enable a user to add another row to the table 306 (e.g., to add another customer to the list). A "details" control element 324 may enable the user to view, among other content, properties of the table 306 including a size of the table 306, a user who created the table 306, a date and time the table 306 was last modified, which user made the last modification, what modification was made, and/or comments added by one or other more users collaborating on the table 306. An "add" control element 326 may enable a user to insert additional data and/or additional data types into the table 306, among other additions that may be made to the table 306. A "share" control element 328 may enable the user to share the table 306 with one or more other users, such as other users collaborating on the table 306, for example.

Prior to optimization, the table 306 may be configured for presentation such that each of the columns 310 is of equal width, despite a varying amount of data contained within the cells 312, 314, 316, 318, and 320 of each of the columns 310. Additionally, the table 306 may be configured for presentation based on a specific platform and device the application enabling the user to create the table 306 is running on. For example, the application may be executing the application through a web-based platform on a laptop computer. Thus, the table 306 may be configured based on device and display capabilities of the laptop computer, which typically has a greater amount of capabilities and a larger display screen than most other portable devices, such as tablets and smart phones. Accordingly, a total width of the columns 310 may extend the length of the large display screen, and a height of the row 308 may extend a significant height of the large display screen.

If the user chooses to share the unoptimized table 306 with one or more other users, the configuration of the table 306 (i.e., the look and feel of the table 306) may not be preserved if the other users view and/or edit the table 306 on a different platform and/or device. For example, if another user is viewing the table 306 on a smart phone, the formatting of the table 306 may appear "funky" or misaligned (e.g., some of the columns 310 may be pushed down almost appearing row-like or only the data itself may appear) because the width of the columns 310 is too large to fit the display screen of the smart phone.

Figure 4:
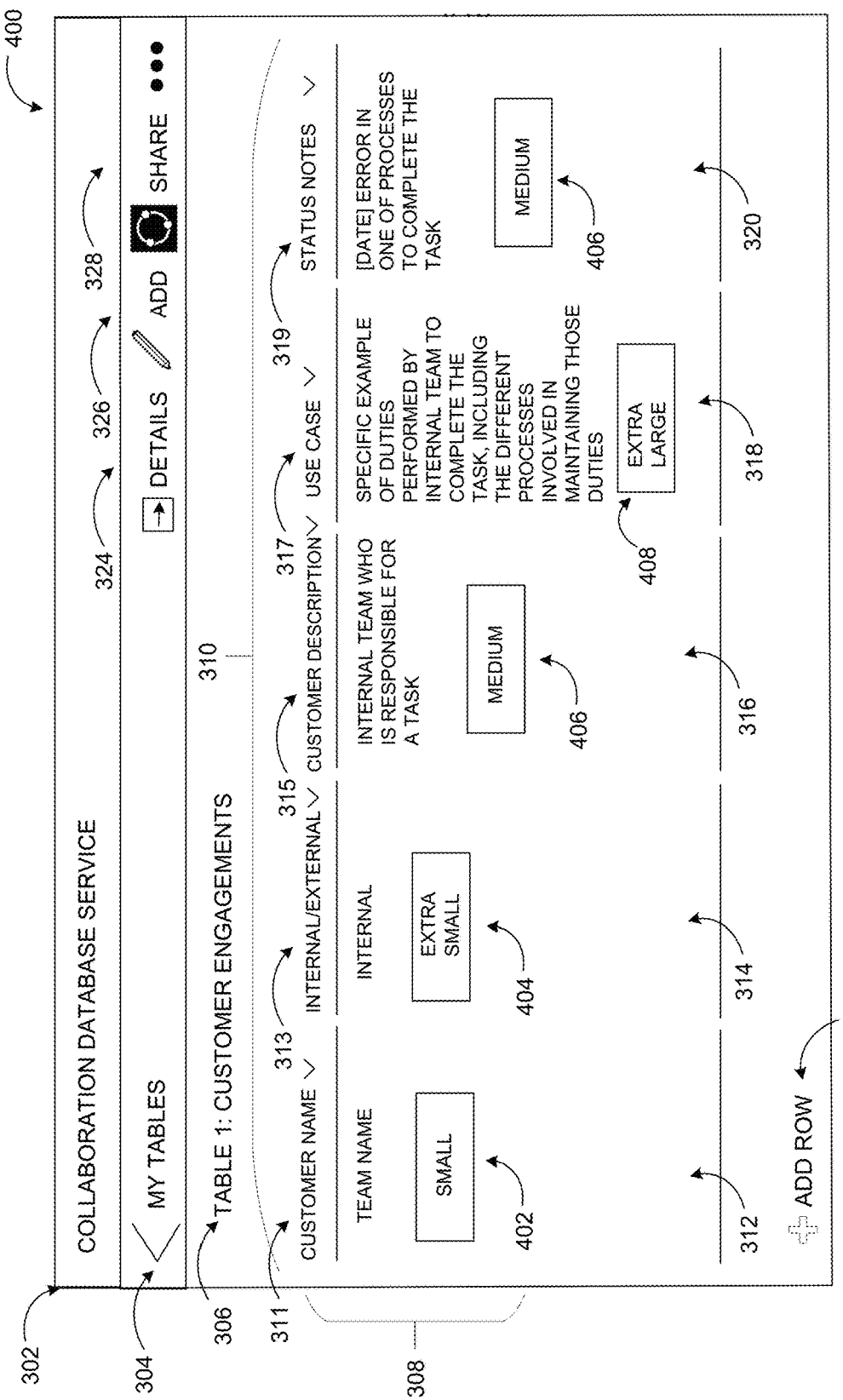
FIG. 4 illustrates a mapping of each cell of a table to a bucket.

FIG. 4 illustrates a mapping of each cell of a table to a bucket. A collaboration database service comprising a collaboration database engine may be provided to enable creation and collaboration of a table on custom databases. Referring back to the elements described in FIG. 3, the collaboration database service may provide the user experience 302 through the application to enable the user to create and/or modify the table 306 through the "My Tables" view 304. The table 306 includes the row 308 and the columns 310 that form the cells 312, 314, 316, 318, and 320, as illustrated. Each of the cells 312, 314, 316, 318, and 320 may contain data, where the data within each cell may be of a different type, size, and/or character count.

Upon detecting creation of the table 306, the collaboration database engine may be configured to determine a character count of data within each of the cells 312, 314, 316, 318, and 320. In some examples, if the character count can be reduced while maintaining a same semantic meaning of the data, the collaboration database engine may also be configured to reduce the character count of the data by employing algorithms to execute one or more reduction processes (see FIG. 7 for a more detailed example of the reduction processes).

The collaboration database engine may be configured to map each of the cells 312, 314, 316, 318, and 320 to a size-based bucket based on the character count of the data or the reduced character count of the data. In some examples, the collaboration database engine may also be configured to map each of the cells 312, 314, 316, 318, and 320 to a size-based bucket based on carriage returns in addition to the character count of the data. The cells 312, 314, 316, 318, and 320 may be mapped to an extra-small bucket 404, a small bucket 402, a medium bucket 406, a large bucket 408, or an extra-large bucket, as illustrated in diagram 400.

Each bucket may be characterized by a predetermined number of pixels supported by the bucket, a number of data characters displayed per line by the bucket, and a general type of information displayed by the bucket. For example, the extra-small bucket 404 may support 100 pixels and fit approximately 0-20 character per line such that a cell with data including first names, last names, a status, or short text may be mapped to the extra-small bucket 404. A small bucket 402 may support 200 pixels, and fit approximately 21-60 characters per line such that a cell with data including full names (last and first), company/customer names, or short text, may be mapped to the small bucket 402. A medium bucket 406 may support 300 pixels and fit approximately 61-100 characters per line such that a cell with data including descriptions, questions, and medium text may be mapped to the medium bucket 406. A large bucket 404 may support 400 pixels and fit approximately 101-140 characters per line such that a cell with data including notes, answers, and medium text may be mapped to the large bucket 404. An extra-large bucket may support 500 pixels, and fit approximately 140 plus characters per line such that a cell with data including long notes, scenarios, use cases, and long text may be mapped to the extra-large. The above listed bucket characterizations are merely provided as examples, and are not intended to be limiting embodiments. For example, the above-described five buckets may be available in web-based platforms to map each of the cells 312, 314, 316, 318, and 320 to.

As shown in the diagram 400, each of the cells 312, 314, 316, 318, and 320 may be mapped to a size-based bucket (e.g., one of buckets 402, 404, 406, and 408). Returning to the example scenario discussed in conjunction with FIG. 3, the table 306 may list customers associated with a company, where the row 308 represents one of the customers. Cell 312 has data including a full name of the customer, and thus may be mapped to the small bucket 402. Cell 314 has data including a short, 8 character count text of either "external" or "internal" to indicate whether the customer is external or internal to the company, and thus the cell 314 may be mapped to the extra-small bucket 404. Cell 316 has data including a description of the customer, and thus the cell 316 may be mapped to the medium bucket 406. Cell 318 has data including a use case scenario to represent the duties or tasks of the customer if the customer is internal to the company (as illustrated) or the needs or desires of the customer if the customer is external to the company, and thus the cell 318 may be mapped to the extra-large bucket 408. Cell 320 has data including notes regarding a status of the customer, and thus may be also mapped to the medium bucket 406.

Alternatively, in mobile platforms, for example, there may only be three buckets, a small bucket, a medium bucket, and a large bucket, to which the cells 312, 314, 316, 318, and 320 may be mapped. In an example implementation, the small bucket may support 125 pt (points), and fit approximately 0-11 characters per line such that a cell with data including first names, last names, a status, and short text may be mapped to the small bucket. The medium bucket may support 188 pt, and fit approximately 12-22 characters per line such that a cell with data including full names (last and first), company names, and short text may be mapped to the medium bucket. The large bucket may support 250 pt, and fit approximately 23-33 characters per line such that a cell with data including descriptions, questions/answers, and long text may be mapped to the large bucket. The above listed bucket characterizations are merely provided as examples, and are not intended to be limiting embodiments.

Figure 5A:
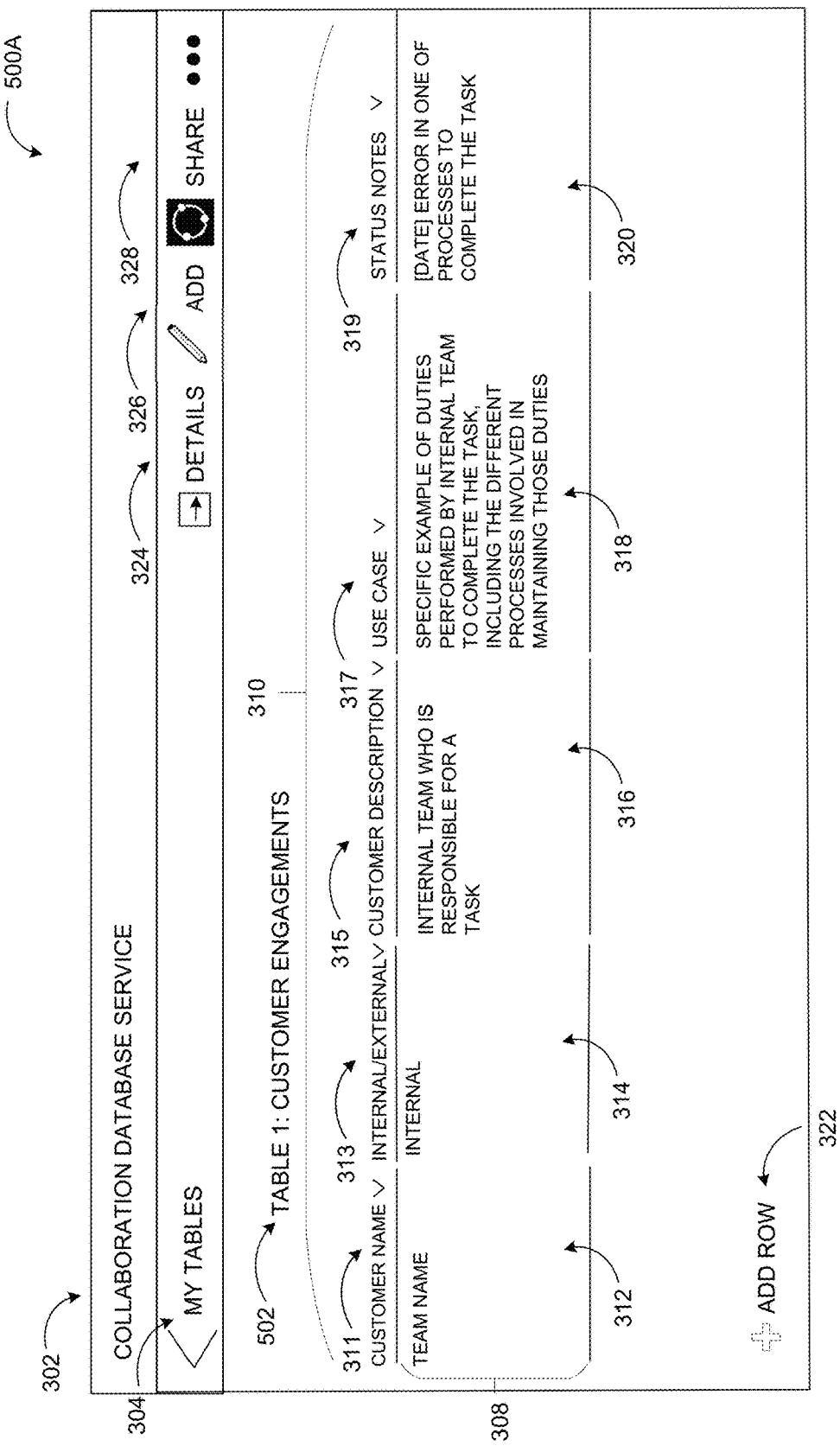
FIGS. 5A-C include example optimal configurations of a table.
Figure 5B:
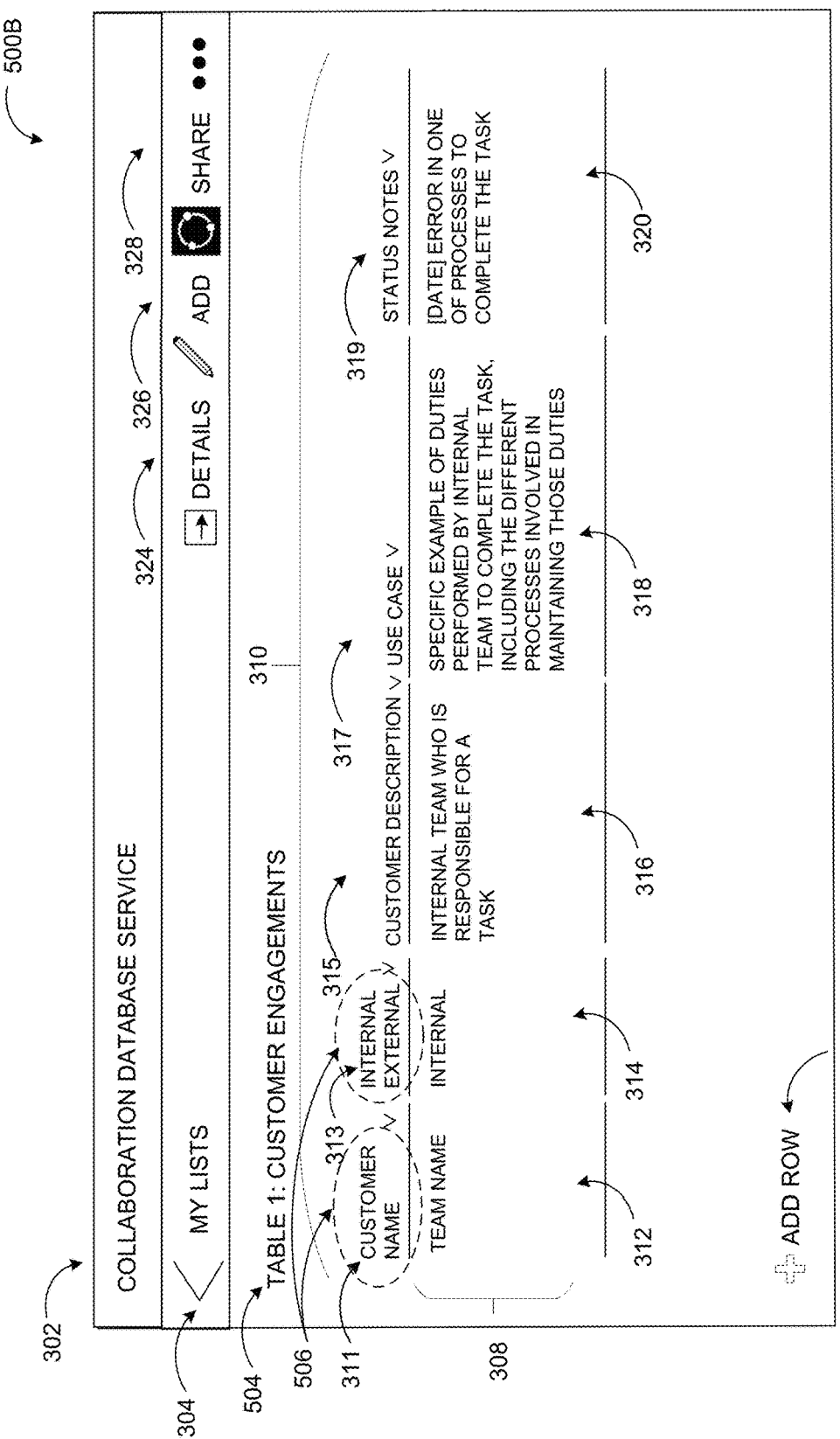
Figure 5C:
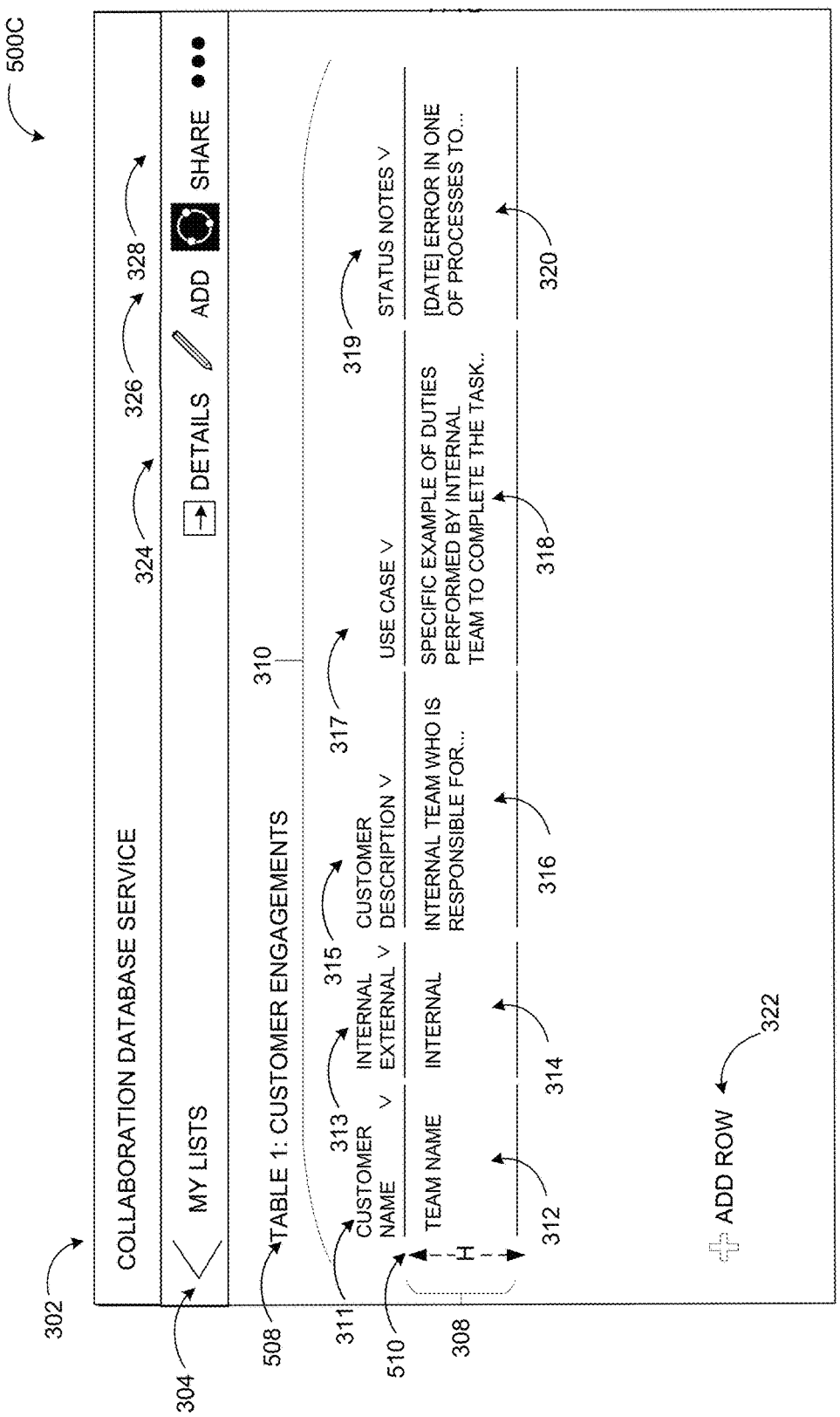

FIGS. 5A-C include example optimal configurations of a table. After each of the cells 312, 314, 316, 318, and 320 are mapped to a bucket, as described in conjunction with FIG. 4, a collaboration database engine may be configured to automatically select an optimal configuration of a table 502 to provide for display through the user experience 302 of the application, as shown in diagram 500A of FIG. 5A. Prior to the optimization of the table (e.g., table 306 described in FIG. 3) each of the columns 310 may have been of an equal width, despite a varying amount of data contained within the cells 312, 314, 316, 318, and 320 of each of the columns 310. In comparison, in the optimal configuration of the table 502, each of the columns 310 may be of a varying width based on an amount of data contained within the cells 312, 314, 316, 318, and 320 of each of the columns 310 such that available display space is better utilized while maximizing an amount of the data presented, as illustrated.

The optimal configuration of the table 502 may be selected based on the mapping, as well as device and/or display capabilities of a device on which the table 502 is being viewed and/or created, and a type of the data within each of the cells 312, 314, 316, 318, and 320. In one embodiment, a width of a column of the table may be selected based on a largest size bucket to which a cell of the column is mapped. In the provided illustration, the width of each of the columns 310 may be selected based on the respective buckets to which the cells 312, 314, 316, and 317 are mapped to because there is only one row 308 (see FIG. 6A-B for an example of how a width of a column may be selected if more than one row). For example, a width of the customer name column 311 may be selected based on the small bucket 402 to which the cell 312 was mapped, and a width of the internal/external column 313 may be selected based on the extra-small bucket 404 to which the cell 314 was mapped. Additionally, a width of the customer description column 315 and status note column 319 may be selected based on the medium bucket 406 to which the cells 316 and 320 were mapped, and a width of the use case column 317 may be selected based on the extra-large bucket 408 to which the cell 318 was mapped.

Accordingly, the use case column 317 may have the largest width and the internal/external column 313 may have the smallest width. However, due to a character count of a label, "Internal/External", of the internal/external column 313, the width selected for the internal/external column 313 may be wider than is necessary to present the data within the cell 314. For example, the data presented within the cell 314 may be consistently 8 characters, however the label may be 17 characters long. To prevent the width of any of the columns 310 from being unnecessarily wide due to the column labels, the column labels may be wrapped to match the width selected for each of the columns 310 based on the mapping.

Diagram 500B of FIG. 5B, illustrates another optimal configuration of a table 504 where one or more labels of the columns 310 have been wrapped 506 to match the width selected for each of the columns 310 based on the mapping, as described above in conjunction with FIG. 5A. For example, a label "Customer Name" of the customer name column 311 and a label "Internal/External" of the internal/external column 313 may be wrapped 506 to match the width selected for the customer name column 311 and the internal/external column 313, respectively. The width of the customer name column 311 may be selected based on the small bucket 402 to which the cell 312 was mapped, and a width of the internal/external column 313 may be selected based on the extra-small bucket 404 to which the cell 314 was mapped. Wrapping 506 may consist of splitting the labels from one line to two lines while maintaining a same semantic meaning of the labels, as illustrated. For example, the label "Customer Name" of the customer name column 311 may be split into two lines such that each line does not exceed a number of characters per line supported by the small bucket 402. For further example, the label "Internal/External" of the internal/external column 313 may be split into two lines such that each line does not exceed a number of characters per line supported by the extra-small bucket 404.

Diagram 500C of FIG. 5C, illustrates a further optimal configuration of a table 508. The collaboration database engine may be configured to adjust a height 510 of the row 308 to further optimize the table 508 for presentation. For example, the height 510 of the row 308 may be adjusted based on device and/or display capabilities of a device on which the table 508 is being viewed and/or created, and/or a type of the data within each of the cells 312, 314, 316, 318, and 320.

As previously discussed in conjunction with FIG. 3, the "share" control element 328 illustrated in FIGS. 5A-5C may enable the user to share a table with one or more other users, such as other users collaborating on the table, for example. Any of the optimal configurations of the table 502, 504, 508 may be shared such that a maximal amount of the data is presented within the cells 312, 314, 316, and 318, and the look and feel of the table as created by the user is preserved no matter what platforms or devices the other users are employing to view and/or edit the table.

Figure 6A:
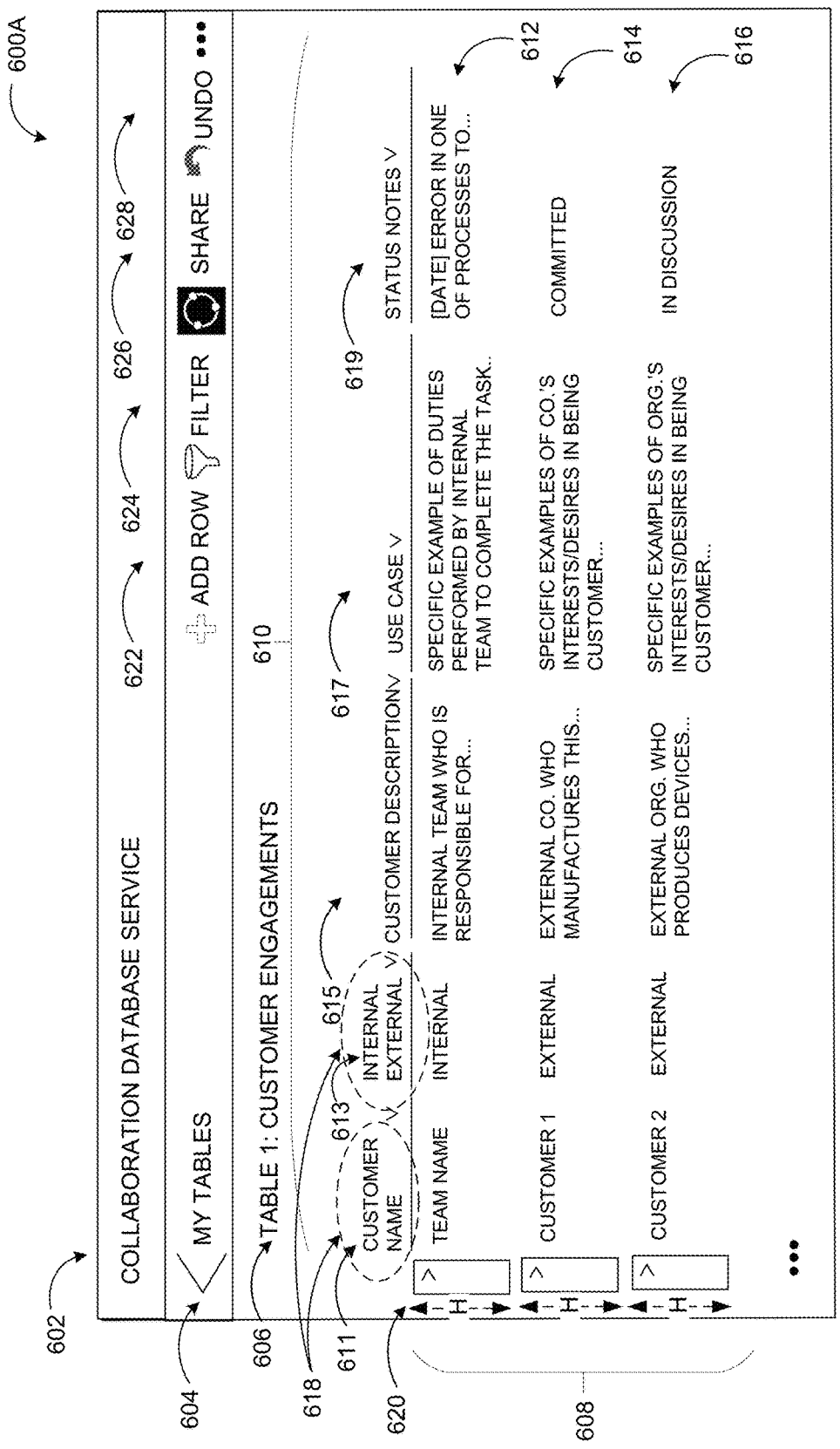
FIGS. 6A-B include examples of an optimal configuration table presented across a variety of platforms and devices.
Figure 6B:
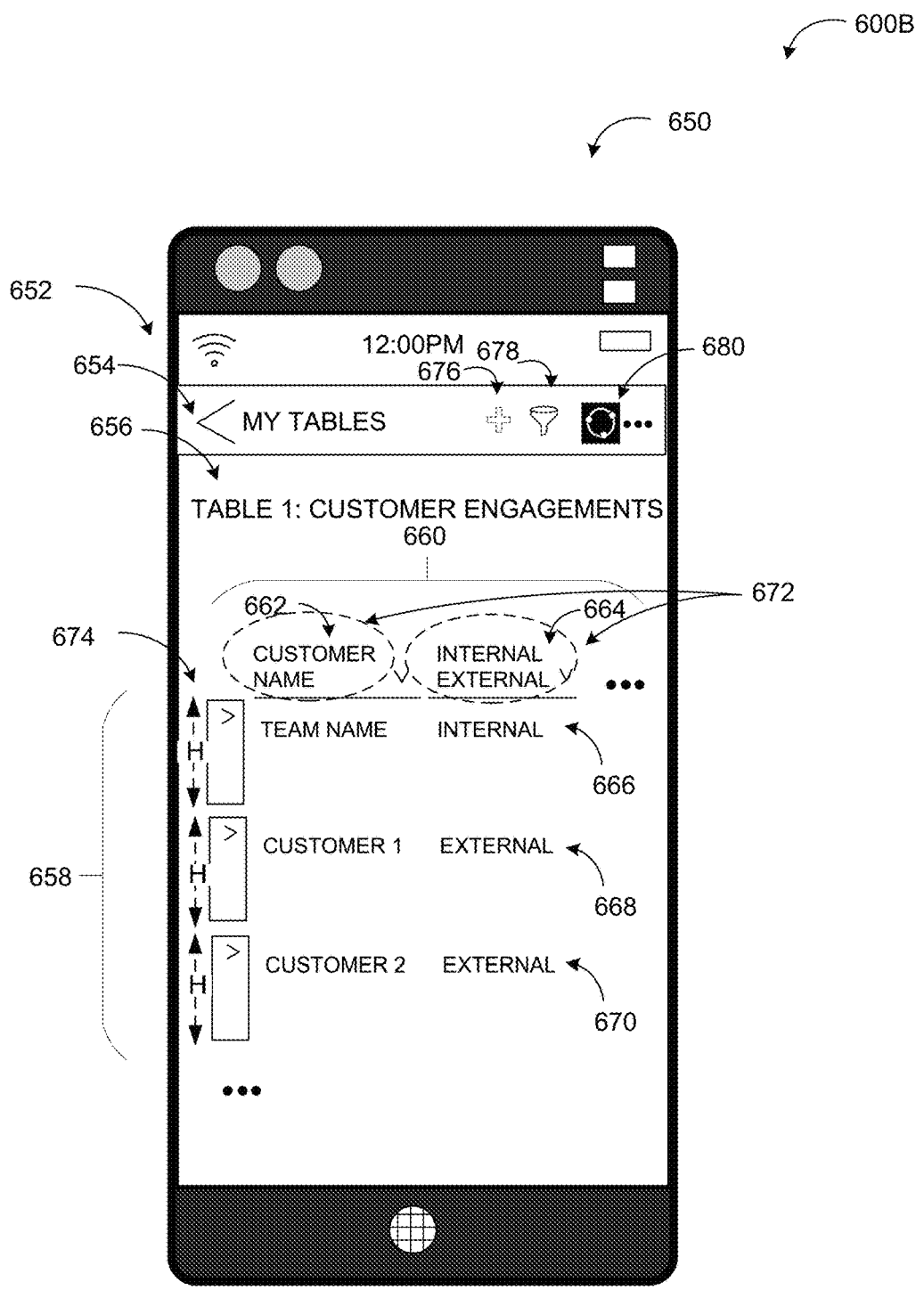

FIGS. 6A-B include examples of an optimal configuration table presented across a variety of platforms and devices. As previously discussed, a collaboration database service may allow end users to create, edit, and share collaborative content, such as a table, on custom databases across a variety of platforms and devices. For example, a collaboration database engine of the collaboration service may be configured to detect creation of a table that includes one or more columns and rows that form cells, determine a character count of data within each cell, map each cell to a bucket based on the character count of the data, and automatically select an optimal configuration of the table to be provided for display. The optimal configuration may maximize an amount of the data to be presented within each cell of the table and enable consistent presentation of the table across a variety of platforms and devices. In an example, scenario, the creator of the table may share the table with a first user executing an application to view and/or edit the table through a web-based platform on a desktop computer, as shown in FIG. 6A, and a second user executing an application to view and/or edit the table through a mobile platform on a mobile device, as shown in FIG. 6B. The creator may be collaborating on the table with the first and second users.

As shown in a diagram 600A, the first user may be viewing and/or editing the table through an application that is being executed on a desktop computer, where an optimal configuration of the table 606 may be presented through a "My Tables" view 604 of a user experience 602 of the application. The application may be a collaboration database application and/or a productivity application associated with the collaboration database service, for example. The optimal configuration of the table 606 may include one or more rows 608 and one or more columns 610 such as a customer name column 611, an internal/external column 613, a customer description column 615, a use case column 617, and a status notes column 619, for example. The rows 608 and columns 610 may form a plurality of cells, such as cells 612, 614, and 616 of the status notes column 619. Each of the columns 610 may be of a varying width based on an amount of data presented within each cell of the column. In one embodiment, a width of each of the columns 610 of the table 606 may have been selected by the collaboration database engine based on a largest size bucket to which a cell of each of the columns 610 was mapped. For example, if the status notes column 619 has three cells 612, 614, and 616, where two of the cells 614 and 616 comprising short text are mapped to a small bucket and the other cell 612 comprising medium text is mapped to a medium bucket, the width of the status notes column 619 may be selected based on the medium bucket. In an alternative embodiment, the collaboration database engine may be configured to determine how many cells of a column are mapped to each size bucket, and the width of the column selected may be based on a size bucket corresponding to a weighted average of the cells of the column. The cells may be individually weighted, for example, based on an importance of the data contained within the cell.

Additionally, the optimal configuration of the table 606 may include wrapped column labels 618 to prevent the width of any of the columns 610 from being wider than is necessary to present the data within the cells of the columns 610. The wrapped column labels 618 may match the width selected for each of the columns 610 based on the mapping, for example. Furthermore, the rows 308 of the optimal configuration of the table 606 may be height adjusted 620. The height adjustment may be based on device and/or display capabilities of the desktop computer on which the table 606 is being viewed and/or edited, and/or a type of the data within each of the cells, for example.

The user experience 602 may also provide one or more controls to enable the first user to interact with the table 606. The control elements may be presented graphically through icons or symbols and/or textually, where the text may describe a function to be performed by the control elements. For example, an "add row" control element 622 may enable the first user to add another row to the table 606. If any modifications are made to the table 606 by the first user, such as addition of a new row or column and/or insertion of new data/data types into the table 606, the collaboration database engine may be configured to adjust the optimal configuration of the table 606 based on the modification. A "filter" control element 624 may enable the first user to filter the table based on a row, column, and/or data within a cell of the table 606, for example. A "share" control element 626 may enable the first user to share the table 606 with one or more other users, such as the creator of the table and the second user collaborating on the table 606, for example. A "undo" control element 628 may enable the first user to delete a prior modification made to the table 606. If any adjustments had been made to the optimal configuration of the table 606 in response to the prior modification, the optimal configuration of the table 606 may be re-adjusted after the selection of the "undo" control element 628.

As shown in diagram 600B of FIG. 6B, the second user may be viewing, and/or editing the table through an application that is being executed on a mobile device 650. An optimal configuration of the table 656 may be presented through a "My Tables" view 654 of a user experience 652 of the application. The application may be a collaboration database application and/or a productivity application associated with the collaboration database service, for example. The optimal configuration of the table 656 may include one or more rows 658 and one or more columns 660. Only a few of the columns, such as a customer name column 662, an internal/external column 664, for example, may be displayed at once due to the smaller display screen of the mobile device 650 enabling the look and the feel of the table as created to be preserved. The second user may swipe right to view and/or edit the remaining columns of the table 656. Similarly, if the table 656 contains additional rows, the second user may swipe down to view and/or edits the remaining rows. The rows 658 and columns 660 may form a plurality of cells, such as cells 666, 668, and 670 of the internal/external column 664. Each of the columns 660 may be of a varying width based on an amount of data presented within each cell of the columns 660. For example, a width of each of the columns 660 of the table 656 may have been selected by the collaboration database engine based on a largest size bucket to which a cell of each of the columns 660 was mapped. For example, if the internal/external column 664 has three cells 666, 668, and 670, where each of the three cells 666, 668, and 670 (comprising 8 character data) are mapped to an extra-small bucket, the width of the internal/external column 664 may be selected based on the extra-small bucket. In an alternative embodiment, the collaboration database engine may be configured to determine how many cells of a column are mapped to each size bucket, and the width of the column selected may be based on a size bucket corresponding to a weighted average of the cells of the column. The cells may be individually weighted, for example, based on an importance of the data contained within the cell.

Additionally, the optimal configuration of the table 656 may include wrapped column labels 672 to prevent the width of any of the columns 660 from being wider than is necessary to present the data within the cells of the columns 660. The wrapped column labels 672 may match the width selected for each of the columns 660 based on the mapping, for example. Furthermore, the rows 658 of the optimal configuration of the table 656 may be height adjusted 674. The height adjustment may be based on device and/or display capabilities of the mobile device 650 on which the table 656 is being viewed and/or edited, and/or a type of the data within each of the cells, for example.

The user experience 652 may also provide one or more controls to enable the first user to interact with the table 656. The control elements may be presented graphically through icons or symbols and/or textually, where the text may describe a function to be performed by the control elements. For example, an "add row" control element 676 may enable the second user to add another row to the table 656. A "filter" control element 678 may enable the first user to filter the table based on a row, column, and/or data within a cell of the table 656, for example. A "share" control element 680 may enable the second user to share the table 656 with one or more other users, such as the creator of the table and the first user collaborating on the table 656, for example.

Figure 7:
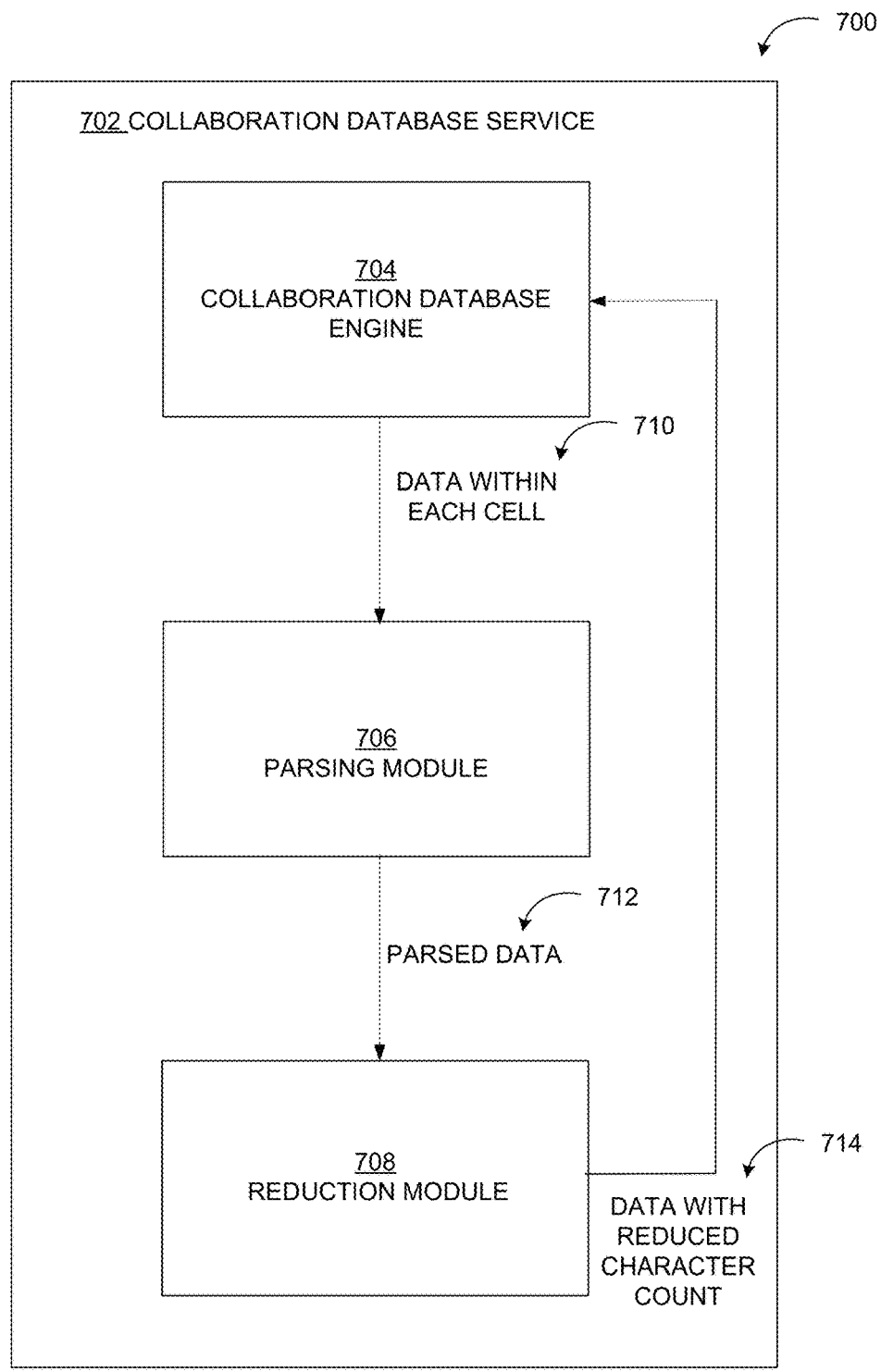
FIG. 7 includes an example infrastructure implemented to reduce a character count of data within a table optimized for presentation across a variety of platforms and device.

FIG. 7 includes an example infrastructure implemented to reduce a character count of data within a table optimized for presentation across a variety of platforms and device. As shown in a diagram 700, a collaboration service 702 may include a collaboration database engine 704, a parsing module 706, and a reduction module 708, among other components. In other embodiments the parsing module 706 and the reduction module 708 may be components of a third party service employed by the collaboration database service 702 (see FIG. 1 for an example).

The collaboration database engine 704 may be configured to detect creation of a table that includes one or more columns and one or more rows that form a plurality of cells. The collaboration database engine 704 may be configured to determine a character count of data within each cell 710. In some examples, carriage returns within each cell may also be determined. If the character count of the data within each cell 710 can be reduced while maintaining a same semantic meaning of the data, the collaboration database engine 704 may also be configured to reduce the character count of the data by employing algorithms to execute a combination of reduction processes with the aid of the parsing module 706 and the reduction module 708.

For example, the parsing module 706 may be configured to parse the data within each cell 710 into one or more levels of parsed data 712 prior to execution of the reduction processes. The levels may include paragraphs, sentences, lists, fragment, and words, among others. The reduction module 708 may be configured to receive the parsed data 712 from the parsing module, and feed the parsed data 712 into the algorithms for execution of the reduction processes. The reduction module 708 may also be configured to monitor the reduction processes until a preferred reduced character count is reached, and provide the data with the reduced character count 714 to the collaboration database engine 704. The collaboration database engine 704 may then be configured to execute the remaining operations to optimize the table for presentation across a variety of platforms and devices, as discussed in detail in conjunction with FIG. 1.

Example reduction processes may include replacement of words formed by characters of the data with acronyms (e.g., "as soon as possible" with "ASAP"), contractions (e.g., "cannot" with "can't"), and/or abbreviations (e.g., "January" with "Jan"). Additional example reduction processes may include gerund reduction of the words (e.g., "running" to "runn"), and elimination of low value words (e.g., "a", "the", "to", "from"). Further example reduction processes may include replacement of words with symbols having a same semantic meaning (e.g., "love" with a heart shaped symbol) and truncation of characters of the data based on a preferred character count (e.g., "We need to implement tasks A, B, C, D, and E to complete the project" with "We need to implement tasks A, . . . to complete the project). The reduction processes may be executed individually by the algorithms, in any combination and/or order.

The examples provided in FIGS. 1 through 7 are illustrated with specific systems, services, applications, engines, modules, and configurations. Embodiments are not limited to environments according to these examples. Optimization of content for consistent presentation through a collaboration service may be implemented in environments employing fewer or additional systems, services, applications, engines, modules, and configurations. Furthermore, the example systems, services, applications, engines, modules, and configurations shown in FIG. 1 through 7 may be implemented in a similar manner with other values using the principles described herein.

Figure 8:
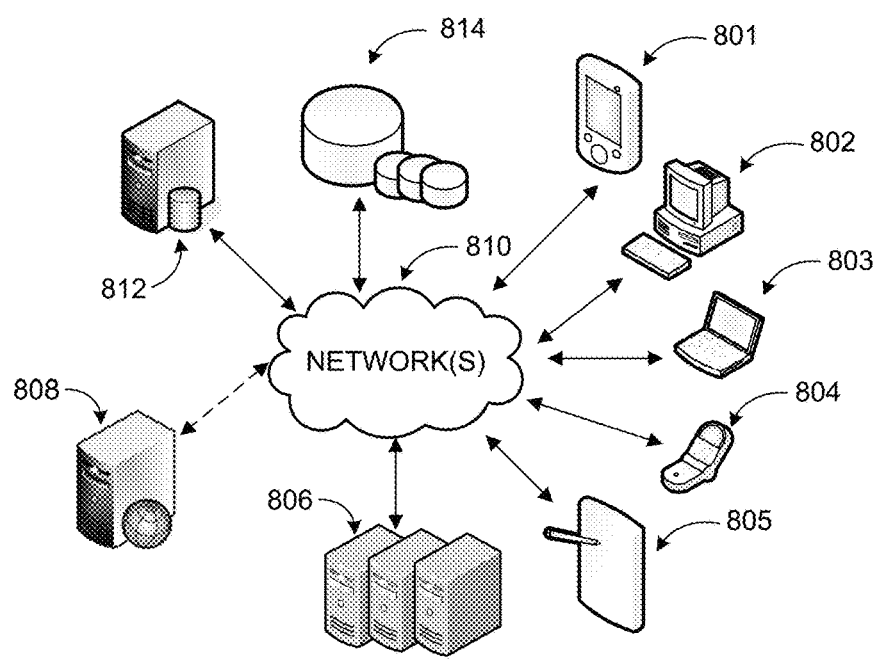
FIG. 8 is a networked environment, where a system according to embodiments may be implemented.

FIG. 8 is a networked environment, where a system according to embodiments may be implemented. In addition to locally installed applications (for example, application 106), a collaboration database engine may also be employed in conjunction with hosted applications and services (for example, a productivity or collaboration database application and/or a collaboration database service) that may be implemented via software executed over one or more servers 806 or individual server 808, as illustrated in diagram 800. A hosted service or application may communicate with client applications on individual computing devices such as a handheld computer 801, a desktop computer 802, a laptop computer 803, a smart phone 804, a tablet computer (or slate), 805 ('client devices') through network(s) 810 and control a user interface presented to users.

Client devices 801-805 are used to access the functionality provided by the hosted service or application. One or more of the servers 806 or server 808 may be used to provide a variety of services as discussed above. Relevant data may be stored in one or more data stores (e.g. data store 814), which may be managed by any one of the servers 806 or by database server 812.

Network(s) 810 may comprise any topology of servers, clients, Internet service providers, and communication media. A system according to embodiments may have a static or dynamic topology. Network(s) 810 may include a secure network such as an enterprise network, an unsecure network such as a wireless open network, or the Internet. Network(s) 810 may also coordinate communication over other networks such as PSTN or cellular networks. Network(s) 810 provides communication between the nodes described herein. By way of example, and not limitation, network(s) 810 may include wireless media such as acoustic, RF, infrared and other wireless media.

Many other configurations of computing devices, applications, engines, modules, data sources, and data distribution systems may be employed for optimizing content for consistent presentation through a collaboration database service. Furthermore, the networked environments discussed in FIG. 8 are for illustration purposes only. Embodiments are not limited to the example applications, engines, modules, or processes.

Figure 9:
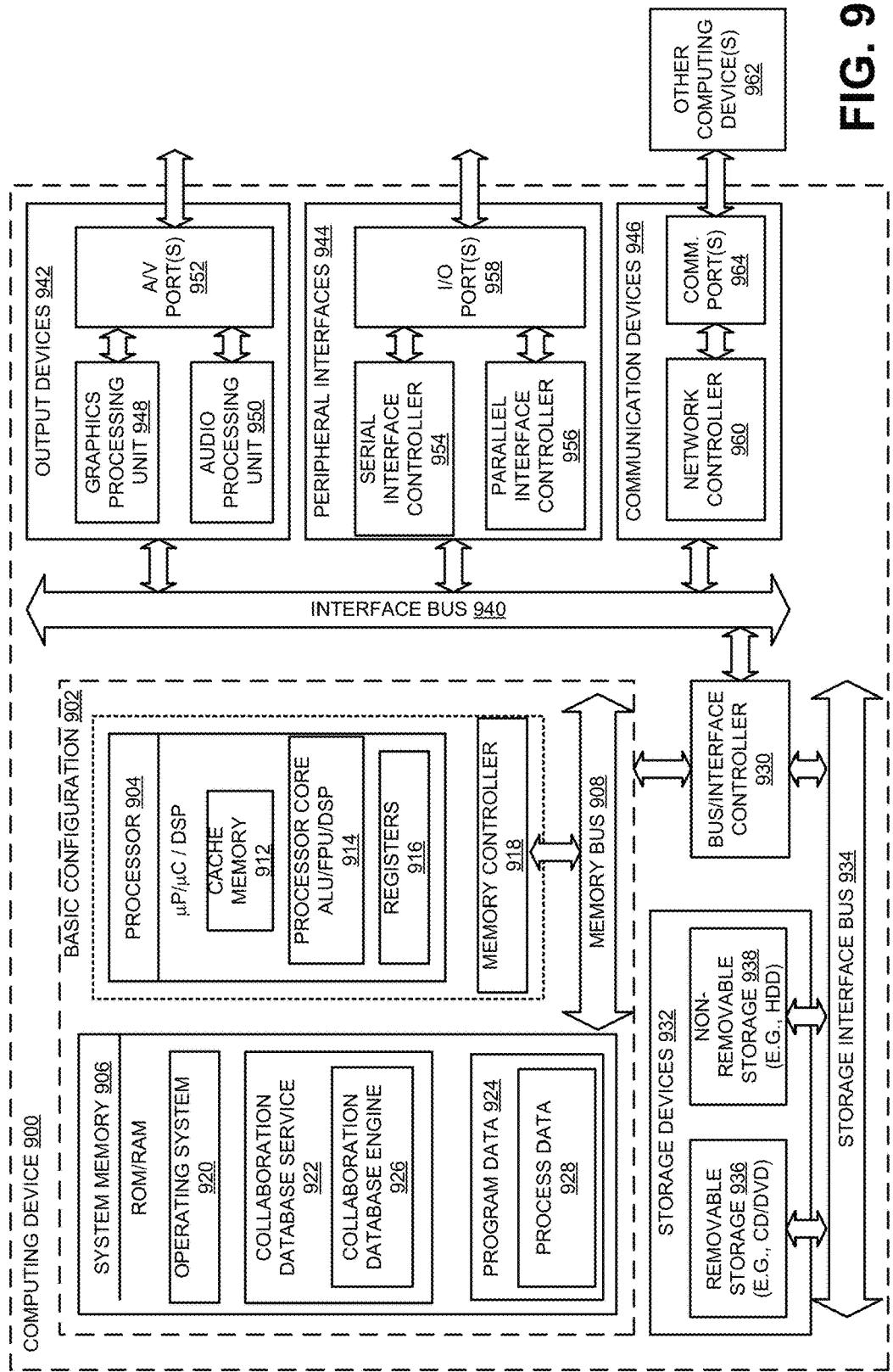
FIG. 9 is a block diagram of an example general purpose computing device, which may be used to optimize content for consistent presentation across a variety of platforms and devices.

FIG. 9 is a block diagram of an example general purpose computing device, which may be used to optimize content for consistent presentation across a variety of platforms and devices.

For example, computing device 900 may be used as a server, desktop computer, portable computer, smart phone, special purpose computer, or similar device. In an example basic configuration 902, the computing device 900 may include one or more processors 904 and a system memory 906. A memory bus 908 may be used for communicating between the processor 904 and the system memory 906. The basic configuration 902 is illustrated in FIG. 9 by those components within the inner dashed line.

Depending on the desired configuration, the processor 904 may be of any type, including but not limited to a microprocessor (µP), a microcontroller (µC), a digital signal processor (DSP), or any combination thereof. The processor 904 may include one more levels of caching, such as a level cache memory 912, one or more processor cores 914, and registers 916. The example processor cores 914 may (each) include an arithmetic logic unit (ALU), a floating point unit (FPU), a digital signal processing core (DSP Core), or any combination thereof. An example memory controller 918 may also be used with the processor 904, or in some implementations, the memory controller 918 may be an internal part of the processor 904.

Depending on the desired configuration, the system memory 906 may be of any type including but not limited to volatile memory (such as RAM), non-volatile memory (such as ROM, flash memory, etc.) or any combination thereof. The system memory 906 may include an operating system 920, a collaboration database service 922, and program data 924. The collaboration database service 922 may include a collaboration database engine 926, which may be an integrated module of the collaboration database service 922. The collaboration database engine 926 may be configured to detect creation of a table through an application associated with the collaboration service, where the table may include one or more columns and one or more rows that form a plurality of cells. The collaboration database engine 922 may also be configured to determine a character count of data within each cell of the plurality of cells, map each cell to a bucket based on the character count of the data, and automatically select an optimal configuration of the table to be provided for display through the application based on the mapping. The program data 924 may include, among other data, process data 928, such as the configurations of the table, and data contained within the table, as described herein.

The computing device 900 may have additional features or functionality, and additional interfaces to facilitate communications between the basic configuration 902 and any desired devices and interfaces. For example, a bus/interface controller 930 may be used to facilitate communications between the basic configuration 902 and one or more data storage devices 932 via a storage interface bus 934. The data storage devices 932 may be one or more removable storage devices 936, one or more non-removable storage devices 938, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 906, the removable storage devices 936 and the non-removable storage devices 938 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (for example, one or more output devices 942, one or more peripheral interfaces 944, and one or more communication devices 946) to the basic configuration 902 via the bus/interface controller 930. Some of the example output devices 942 include a graphics processing unit 948 and an audio processing unit 950, which may be configured to communicate to various external devices such as a display or speakers via one or more A/V ports 952. One or more example peripheral interfaces 944 may include a serial interface controller 954 or a parallel interface controller 956, which may be configured to communicate with external devices such as input devices (for example, keyboard, mouse, pen, voice input device, touch input device, etc.) or other peripheral devices (for example, printer, scanner, etc.) via one or more I/O ports 958. An example communication device 946 includes a network controller 960, which may be arranged to facilitate communications with one or more other computing devices 962 over a network communication link via one or more communication ports 964. The one or more other computing devices 962 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 900 may be implemented as a part of a general purpose or specialized server, mainframe, or similar computer that includes any of the above functions. The computing device 900 may also be implemented as a personal computer including both laptop computer and non-laptop computer configurations.

Example embodiments may also include methods for optimizing content for consistent presentation through a collaboration database service. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 10:
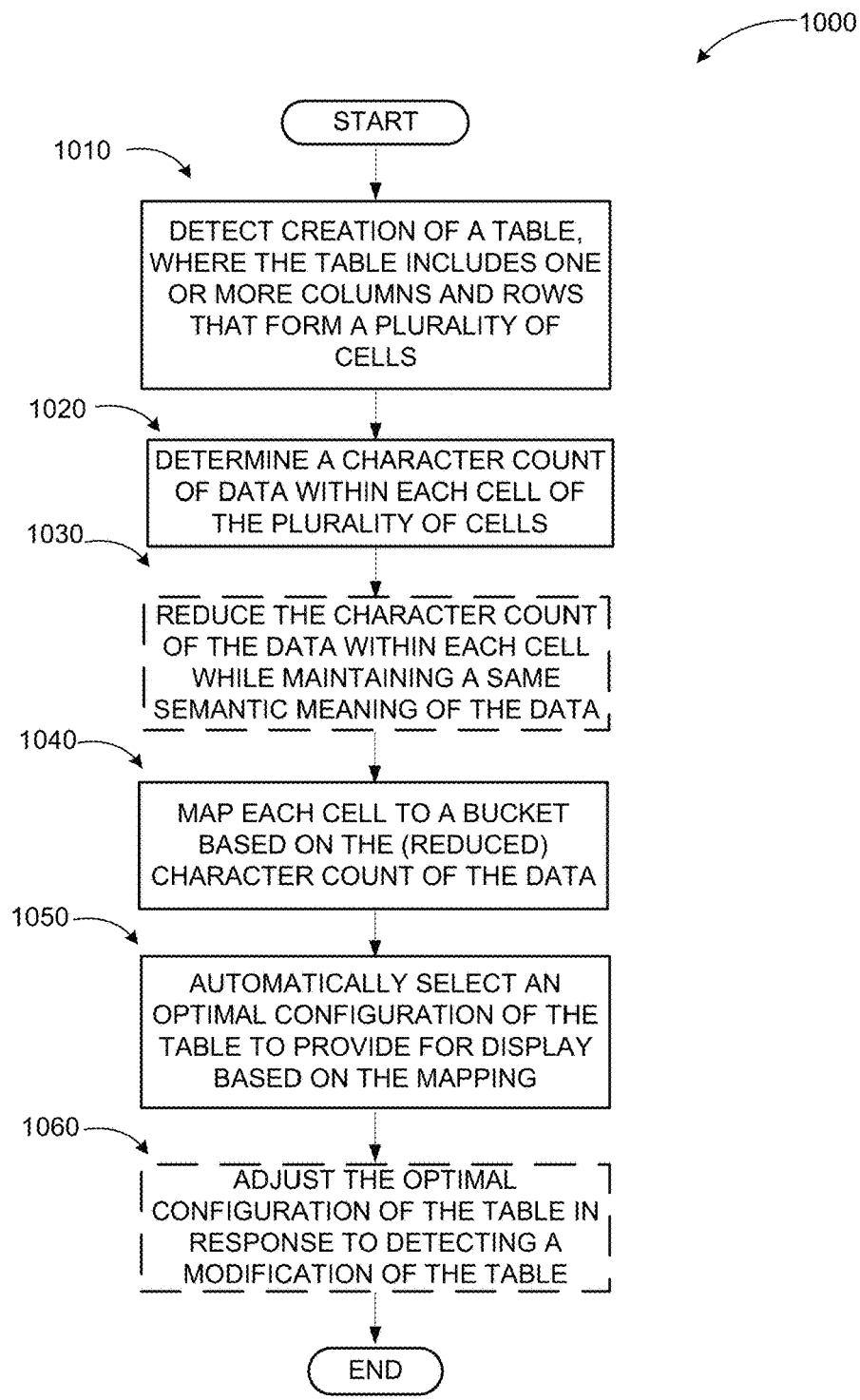
FIG. 10 illustrates a logic flow diagram of a method to optimize content for consistent presentation across a variety of platforms and devices, according to embodiments.

FIG. 10 illustrates a logic flow diagram of a method to optimize content for consistent presentation across a variety of platforms and devices, according to embodiments.

Process 1000 may be implemented on a computing device, server, or other system. An example system may include a server configured to execute a collaboration database service provided to enable creation and collaboration of content on custom databases, where the content may be optimized for presentation across multiple platforms and devices. The server may include, among other components, one or more processors configured to execute a collaboration database engine of the collaboration database service. The collaboration database service may also integrate and/or interoperate with a productivity application that is being executed on a device associated with a customer such that the customer may create collaborative content through the productivity application that may be shared and edited through the collaboration database service.

Process 1000 begins with operation 1010, where the collaboration database engine may be configured to detect creation of a table through an application associated with the collaboration service. The application may be a collaboration database application or the productivity application, for example. The table may include one or more columns and one or more rows that form a plurality of cells.

At operation 1020, the collaboration database engine may be configured to determine a character count of data within each cell of the plurality of cells. In some examples, carriage returns within each cell may also be determined. At operation 1030, if the character count of the data within each cell may be reduced while maintaining a same semantic meaning of the data, the collaboration database engine may optionally be configured to reduce the character count of the data by employing algorithms to execute a combination of reduction processes. In some embodiments, a parsing module and a reduction module may be employed by the collaboration database engine, where the parsing module and reduction module may be integral modules of the collaboration database service and/or modules of a third party service. The parsing module may be configured to parse the data within each cell into one or more levels prior to execution of the reduction processes, wherein the levels include at least paragraphs, sentences, lists, fragment, and words. The reduction module may be configured to provide the parsed data to the algorithms for execution of the reduction processes, and monitor the reduction processes until a preferred character count is reached. The reduction processes may include replacement of words formed by characters of the data with acronyms, contractions, and/or abbreviations, gerund reduction of words, elimination of low value words, replacement of words with symbols having a same semantic meaning and/or truncation of characters of the data based on a preferred character count.

At operation 1040, the collaboration database engine may be configured to map each cell to a bucket based on the character count of the data (or the reduced character count of the data if the operation 1030 is executed). For example, each cell may be mapped to one of an extra small bucket, a small bucket, a medium bucket, a large bucket, and an extra-large bucket based on the character count of the data within each cell. In some embodiments, each cell may be mapped to the bucket based on carriage returns in addition to the character count of the data within each cell.

At operation 1050, the collaboration database engine may be configured to automatically select an optimal configuration of the table to be provided for display through the application. The optimal configuration may maximize an amount of the data to be presented within each cell of the table and enable consistent presentation of the table across a variety of platforms and devices. The optimal configuration may be automatically selected based on the mapping. For example, a width of a column of the table may be selected based on a largest size bucket to which a cell of the column is mapped. Alternatively, the collaboration database engine may be configured to determine how many cells of a column are mapped to each size bucket, and the width of the column selected may be based on a size bucket corresponding to a weighted average of the cells of the column. The cells may be weighted for example, based on an importance of the data contained within the cell. Either of these selection processes may be repeated for each column of the table. Additionally, a label of the column may be wrapped to match the width selected for the column. The optimal configuration may be automatically selected further based on device capabilities and/or display capabilities of the device, and a type of the data. For example, a height of the rows of the table may be adjusted based on device capabilities and/or display capabilities of the device, and a type of the data.

At operation 1060, the collaboration database engine may be configured to adjust the optimal configuration of the table in response to detecting a modification to the table. An example of a modification detected may include additional data being inserted into the table and/or an additional data type being inserted into the table.

The operations included in process 1000 are for illustration purposes. Optimizing content presentation for consistent presentation across a variety of platforms and devices through a collaboration database service may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments a means to optimize content for consistent presentation through a collaboration database service may be provided, where the means may include detecting creation of a table through an application associated with the collaboration service, where the table may include one or more columns and one or more rows that form a plurality of cells. The means may also include determining a character count of data within each cell, mapping each cell to a bucket based on the character count of the data, and automatically selecting an optimal configuration of the table to be provided for display through the application based on the mapping, where the optimal configuration may maximize an amount of the data presented within each cell of the table and enable consistent presentation of the table across a variety of platforms and devices. The means may further include adjusting the optimal configuration of the table in response to detecting a modification to the table.

According to some examples, a method to optimize content for consistent presentation through a collaboration database service may be provided. An example method may include detecting creation of a table through an application associated with the collaboration service, where the table may include one or more columns and one or more rows that form a plurality of cells. The method may also include determining a character count of data within each cell, mapping each cell to a bucket based on the character count of the data, and automatically selecting an optimal configuration of the table to be provided for display through the application based on the mapping, where the optimal configuration may maximize an amount of the data presented within each cell of the table and enable consistent presentation of the table across a variety of platforms and devices. The method may further include adjusting the optimal configuration of the table in response to detecting a modification to the table.

In other examples, an optimal configuration of the table may be automatically selected based on device capabilities, display capabilities of a device, and/or a type of the data. The bucket may be a size-based bucket and mapping each cell to the bucket based on the character count of the data may include mapping each cell to an extra small bucket, a small bucket, a medium bucket, a large bucket, or an extra-large bucket based on the character count of the data within each cell.

Each cell may be mapped to the bucket based on carriage returns in addition to the character count of the data within each cell. The optimal configuration of the table may be automatically selected by selecting a width for a column of the table based on a largest size bucket to which a cell of the column is mapped. How many cells of the column are mapped to each size of bucket may be determined and the width of the column may be selected based on a weighted average. A label of the column may be wrapped to match the width selected for the column.

In other examples, the character count of the data within each cell may be reduced by employing one or more algorithms to execute one or more reduction processes. A parsing module may be employed to parse the data within each cell into one or more levels prior to execution of the reduction processes, and a reduction module may be employed to provide the parsed data to the algorithms for execution of the reduction processes and monitor the reduction processes until a preferred character count is reached. The optimal configuration of the table may be adjusted in response to a detection of additional data being inserted into the table. The optimal configuration of the table may be adjusted in response to a detection of a new type of data being inserted into the table.

According to some embodiments, a server to optimize content for consistent presentation through a collaboration database service may be described. An example server may include a memory configured to store instructions and one or more processors coupled to the memory. The processors may be configured to execute, in conjunction with the instructions stored in the memory, a collaboration database engine integrated with the collaboration database service. The collaboration database engine may be configured to detect creation of a table through an application associated with the collaboration service, where the table may include one or more columns and one or more rows that form a plurality of cells. The collaboration database engine may also be configured to determine a character count of data within each cell, reduce the character count of the data within each cell if the character count can be reduced while maintaining a same semantic meaning of the data, map each cell to a bucket based on the reduced character count of the data, and automatically select an optimal configuration of the table to be provided for display through the application based on the mapping, where the optimal configuration may maximize an amount of the data presented within each cell of the table and enable consistent presentation of the table across a variety of platforms and devices. The collaboration database engine may be further configured to adjust the optimal configuration of the table in response to detecting a modification to the table.

In other embodiments, the character count of the data within each cell may be reduced by employing one or more algorithms to execute one or more reduction processes. The reduction processes may include replacement of words formed by characters of the data with one or more of acronyms, contractions, abbreviations, gerund reduction of words formed by characters of the data, elimination of low value words formed by characters of the data, replacement of words formed by characters of the input data with symbols having a same semantic meaning, and truncation of characters of the data based on a preferred character count. A parsing module may be employed to parse the data within each cell into one or more levels prior to execution of the reduction processes, where the levels may include paragraphs, sentences, lists, fragment, and/or words. A reduction module may be employed to provide the parsed data to the algorithms for execution of the reduction processes and monitor the reduction processes until a preferred character count is reached. A parsing module and a reduction module may be integrated modules of the collaboration database service or modules hosted by a third party service.

According to some example, a mobile computing device to display content optimized for consistent presentation from a collaboration database service may be described. The mobile computing device may include a memory configured to store instructions, and one or more processors coupled to the memory. The one or more processors may be configured to execute, in conjunction with the instructions stored in the memory, an application associated with the collaboration database service. The application may be configured to enable creation and/or modification of a table, wherein the table may include one or more columns and one or more rows that form a plurality of cells. The application may also be further configured to receive an optimal configuration of the table from the collaboration database service, where the optimal configuration of the table may be based on a mapping of each cell of the plurality of cells to a bucket based on a character count of the data within each cell, and display the optimal configuration of the table, where the optimal configuration may maximize an amount of the data presented within each cell of the table and enable consistent presentation of the table across a variety of platforms and devices.

In other examples, an adjusted optimal configuration of the table may be received from the collaboration database service to display in response to a modification of the table, and the adjusted optimal configuration of the table may be displayed. The automatically selected optimal configuration includes a pre-set design of the table.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to optimize content for consistent presentation through a collaboration database service, the method comprising:
   detecting creation of a table through an application associated with the collaboration database service, wherein the table comprises one or more columns and one or more rows that form a plurality of cells;
   determining a character count of data within individual cells of the plurality of cells;
   mapping the individual cells to individual buckets of a plurality of buckets based on the character count of the data within the individual cells, wherein a first set of cells within a particular column are mapped to a first bucket based on at least one first character count of the first set of cells matching a first criteria associated with the first bucket and a second set of cells within the particular column are mapped to a second bucket based on at least one second character count of the second set of cells matching a second criteria associated with the second bucket, and wherein the first criteria is different than the second criteria;
   selecting an optimal configuration of the table to be provided for display through the application based on the mapping, wherein the optimal configuration prescribes a width for the particular column, and wherein the width for the particular column is determined based at least in part on the second set of cells within the particular column being mapped to the second bucket that is different than the first bucket to which the first set of cells within the particular column are mapped; and
   adjusting the optimal configuration of the table in response to detecting a modification to the table.

2. The method of claim 1, wherein selecting the optimal configuration of the table further comprises:
   selecting the optimal configuration of the table based on one or more of:
   device capabilities, display capabilities of a device, and a type of the data.

3. The method of claim 1, wherein at least some of the individual buckets are size-based buckets and mapping the individual cells to the individual buckets based on the character count of the data further comprises:
   mapping the individual cells to one of an extra small bucket, a small bucket, a medium bucket, a large bucket, and an extra-large bucket based on the character count of the data within the individual cells.

4. The method of claim 3, further comprising:
   mapping the individual cells to the individual buckets based on carriage returns in addition to the character count of the data within the individual cells.

5. The method of claim 3, wherein selecting the optimal configuration of the table to be provided for display through the application based on the mapping further comprises:
   selecting the width for the particular column of the table based on a largest size bucket to which a cell of the particular column is mapped.

6. The method of claim 5, further comprising:
   determining how many cells of the particular column are mapped to each size of bucket; and
   selecting the width of the particular column based on a weighted average.

7. The method of claim 5, further comprising:
   wrapping a label of the particular column to match the width selected for the particular column.

8. The method of claim 1, further comprising:
   reducing the character count of the data within at least one individual cell of the plurality of cells by employing one or more algorithms to execute one or more reduction processes.

9. The method of claim 8, further comprising:
   employing a parsing module configured to parse the data within the at least one individual cell into one or more levels prior to execution of the one or more reduction processes; and
   employing a reduction module configured to provide the parsed data to the one or more algorithms for execution of the one or more reduction processes, and monitor the one or more reduction processes until a preferred character count is reached.

10. The method of claim 1, wherein adjusting the optimal configuration of the table in response to detecting the modification to the table comprises:
adjusting the optimal configuration of the table in response to a detection of additional data being inserted into the table.

11. The method of claim 1, wherein adjusting the optimal configuration of the table in response to detecting the modification to the table comprises:
adjusting the optimal configuration of the table in response to a detection of a new type of data being inserted into the table.

12. A server to optimize content for consistent presentation through a collaboration database service, the server comprising:
a memory configured to store instructions; and
one or more processors coupled to the memory, the one or more processors configured to execute, in conjunction with the instructions stored in the memory, a collaboration database engine integrated with the collaboration database service, wherein the collaboration database engine is configured to:
detect creation of a table through an application associated with the collaboration database service, wherein the table comprises one or more columns and one or more rows that form a plurality of cells;
determine a character count of data within individual cells of the plurality of cells;
reduce the character count of the data within at least some of the individual cells to generate a reduced character count of the data that maintains a same semantic meaning of the data within the at least some of the individual cells;
map the individual cells to individual buckets of a plurality of buckets based at least in part on the reduced character count of the data, wherein a first set of cells within a particular column are mapped to a first bucket based on first criteria and a second set of cells within the particular column are mapped to a second bucket based on second criteria that is different than the first criteria;
select an optimal configuration of the table to be provided for display through the application, wherein the optimal configuration prescribes a width for the particular column, and wherein the width for the particular column is determined based at least in part on the second set of cells within the particular column being mapped to the second bucket that is different than the first bucket to which the first set of cells within the particular column are mapped; and
adjust the optimal configuration of the table in response to detecting a modification to the table.

13. The server of claim 12, wherein the collaboration database engine is configured to reduce the character count of the data within the at least some of the individual cells by employing one or more algorithms to execute one or more reduction processes.

14. The server of claim 13, wherein the one or more reduction processes comprise:
replacement of words formed by characters of the data with one or more of acronyms, contractions, abbreviations;
gerund reduction of words formed by characters of the data;
elimination of low value words formed by characters of the data;
replacement of words formed by characters of the input data with symbols having a same semantic meaning; or
truncation of characters of the data based on a preferred character count.

15. The server of claim 13, wherein the collaboration database engine is further configured to:
employ a parsing module configured to parse the data within the at least some of the individual cells into one or more levels prior to execution of the one or more reduction processes, wherein the one or more levels include at least paragraphs, sentences, lists, fragment, and words.

16. The server of claim 13, wherein the collaboration database engine is further configured to:
employ a reduction module configured to provide the parsed data to the one or more algorithms for execution of the one or more reduction processes and monitor the one or more reduction processes until a preferred character count is reached.

17. The server of claim 12, wherein a parsing module and a reduction module are one of: integrated modules of the collaboration database service and modules hosted by a third party service.

18. A mobile computing device to display content optimized for consistent presentation from a collaboration database service, the mobile computing device comprising:
a memory configured to store instructions; and
one or more processors coupled to the memory, the one or more processors configured to execute, in conjunction with the instructions stored in the memory, an application associated with the collaboration database service, wherein the application is configured to:
enable at least one of creation or modification of a table, wherein the table comprises one or more columns and one or more rows that form a plurality of cells;
receive an optimal configuration of the table from the collaboration database service, wherein the optimal configuration of the table is based on a mapping of at least some individual cells of the plurality of cells to individual buckets based on a character count of the data within the individual cells, wherein a first set of cells within a particular column of the table are mapped to a first bucket based on first criteria and a second set of cells within the particular column of the table are mapped to a second bucket based on second criteria that is different than the first criteria; and
display the optimal configuration of the table.

19. The mobile computing device of claim 18, wherein the application is further configured to:
receive an adjusted optimal configuration of the table from the collaboration database service to display in response to a modification of the table; and
display the adjusted optimal configuration of the table.

20. The mobile computing device of claim 18, wherein the optimal configuration includes a pre-set design of the table.

* * * * *